(12) United States Patent
Baliga et al.

(10) Patent No.: US 12,473,368 B2
(45) Date of Patent: *Nov. 18, 2025

(54) CD25 ANTIBODIES

(71) Applicant: iBio, Inc., Bryan, TX (US)

(72) Inventors: Ramesh Baliga, Redwood City, CA (US); Leonard George Presta, San Francisco, CA (US); Phung Tu Gip, San Francisco, CA (US); Hanako Daino-Laizure, San Jose, CA (US); Piotr J. Zalicki, Belmont, CA (US); Oleg Gurinovich, San Leandro, CA (US)

(73) Assignee: iBio, Inc., San Diego, CA (US)

( * ) Notice: Subject to any disclaimer, the term of this patent is extended or adjusted under 35 U.S.C. 154(b) by 561 days.

This patent is subject to a terminal disclaimer.

(21) Appl. No.: 17/524,852

(22) Filed: Nov. 12, 2021

(65) Prior Publication Data

US 2022/0153852 A1 May 19, 2022

Related U.S. Application Data

(60) Provisional application No. 63/113,784, filed on Nov. 13, 2020.

(51) Int. Cl.
| | |
|---|---|
| *C07K 16/28* | (2006.01) |
| *A61K 39/00* | (2006.01) |
| *A61P 35/00* | (2006.01) |

(52) U.S. Cl.
CPC .......... *C07K 16/2866* (2013.01); *A61P 35/00* (2018.01); *A61K 2039/505* (2013.01); *C07K 2317/24* (2013.01); *C07K 2317/41* (2013.01); *C07K 2317/732* (2013.01); *C07K 2317/92* (2013.01)

(58) Field of Classification Search
CPC ............ C07K 16/2866; C07K 2317/24; C07K 2317/41; C07K 2317/732; C07K 2317/92; C07K 2317/30; C07K 2317/75; C07K 2317/76; A61P 35/00; A61K 2039/505
See application file for complete search history.

(56) References Cited

U.S. PATENT DOCUMENTS

| | | | | |
|---|---|---|---|---|
| 12,129,302 B2 * | 10/2024 | Phan | ............... | C07K 16/2866 |
| 12,215,163 B2 * | 2/2025 | Gip | ................. | A61P 35/04 |
| 2017/0029530 A1 | 2/2017 | Saunders et al. | | |
| 2019/0135925 A1 | 5/2019 | Quezada et al. | | |
| 2021/0317499 A1 * | 10/2021 | Peng | ............... | C12P 21/005 |
| 2023/0220102 A1 * | 7/2023 | Gip | ................. | A61P 35/04 |
| | | | | 424/143.1 |

FOREIGN PATENT DOCUMENTS

| | | | | |
|---|---|---|---|---|
| WO | 2010045340 A1 | 4/2010 | | |
| WO | WO-2019175223 A1 * | 9/2019 | ....... | A61K 39/39533 |
| WO | 2020/102591 A1 | 5/2020 | | |
| WO | 2022104009 A1 | 5/2022 | | |

OTHER PUBLICATIONS

Bielekova, B., et al., "Intrathecal effects of daclizumab treatment of multiple sclerosis." Neurology. 2011; 77, 1877-1886 (Year: 2011).*
Rabia et al. 2018, J. Biochem. Eng. vol. 137: 365-374 (Year: 2018).*
Chiu, M., et al., "Antibody structure and function: The basis for engineering therapeutics." Antibodies 2019 8(4), 55 (Year: 2019).*
U.S. Appl. No. 17/821,295, filed Aug. 22, 2022.*
U.S. Appl. No. 17/320,125, filed May 13, 2021.*
United States Patent & Trademark Office (ISA), International Search Report and Written Opinion for PCT/US21/59068 dated Mar. 25, 2022, 11 pp.
European Patent Office, European Search Report for EP Appl. No. 21892842.2 dated Sep. 16, 2024, 9 pp.

* cited by examiner

*Primary Examiner* — Marianne P Allen
(74) *Attorney, Agent, or Firm* — Edwin S. Flores; Daniel J. Chalker; Chalker Flores, LLP

(57) ABSTRACT

Provided herein are humanized CD25 antibodies, methods of making, and use thereof. In some embodiments, the CD25 antibodies are useful for the treatment of cancer or autoimmune diseases.

12 Claims, 8 Drawing Sheets
Specification includes a Sequence Listing.

SEQUENCE LISTING

<160> NUMBER OF SEQ ID NOS: 15

<210> SEQ ID NO 1
<211> LENGTH: 115
<212> TYPE: PRT
<213> ORGANISM: Artificial Sequence
<220> FEATURE:
<223> OTHER INFORMATION: Synthetic: D11 VH

<400> SEQUENCE: 1

```
Gln Ile Gln Leu Gln Gln Pro Gly Ala Glu Leu Val Arg Pro Gly Val
1               5                   10                  15

Ser Leu Lys Ile Ser Cys Lys Gly Ser Gly Tyr Thr Phe Thr Asp Tyr
            20                  25                  30

Ala Met His Trp Val Arg Gln Ser His Ala Lys Ser Leu Glu Trp Ile
        35                  40                  45

Gly Val Ile Ser Thr Tyr Ser Gly Asp Ala Ile Tyr Asn Gln Lys Phe
    50                  55                  60

Lys Gly Lys Ala Thr Met Thr Val Asp Lys Ser Ser Thr Ala Tyr
65                  70                  75                  80

Leu Glu Leu Ala Arg Leu Thr Ser Asp Asp Ser Ala Ile Tyr Tyr Cys
                85                  90                  95

Ala Arg Gly Val Thr Phe Asp Tyr Trp Gly Gln Gly Thr Thr Val Thr
            100                 105                 110

Val Ser Ser
        115
```

<210> SEQ ID NO 2
<211> LENGTH: 115
<212> TYPE: PRT
<213> ORGANISM: Artificial Sequence
<220> FEATURE:
<223> OTHER INFORMATION: Synthetic: hD11-H1

<400> SEQUENCE: 2

```
Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Asp Tyr
            20                  25                  30

Ala Met His Trp Val Arg Gln Ala Pro Gly Gln Gly Leu Glu Trp Met
        35                  40                  45

Gly Val Ile Ser Thr Tyr Ser Gly Asp Ala Ile Tyr Ala Gln Lys Phe
    50                  55                  60

Gln Gly Arg Val Thr Met Thr Arg Asp Thr Ser Thr Ser Thr Val Tyr
65                  70                  75                  80

Met Glu Leu Ser Ser Leu Arg Ser Glu Asp Thr Ala Val Tyr Tyr Cys
                85                  90                  95

Ala Arg Gly Val Thr Phe Asp Tyr Trp Gly Gln Gly Thr Thr Val Thr
            100                 105                 110

Val Ser Ser
        115
```

<210> SEQ ID NO 3
<211> LENGTH: 115
<212> TYPE: PRT

```
<213> ORGANISM: Artificial Sequence
<220> FEATURE:
<223> OTHER INFORMATION: Synthetic: hD11-H2

<400> SEQUENCE: 3

Gln Val Gln Leu Val Gln Ser Gly Ala Glu Val Lys Lys Pro Gly Ala
1               5                   10                  15

Ser Val Lys Val Ser Cys Lys Gly Ser Gly Tyr Thr Phe Thr Asp Tyr
                20                  25                  30

Ala Met His Trp Val Arg Gln Ala Pro Gly Gln Gly Leu Glu Trp Met
            35                  40                  45

Gly Val Ile Ser Thr Tyr Ser Gly Asp Ala Ile Tyr Ala Gln Lys Phe
        50                  55                  60

Gln Gly Arg Val Thr Met Thr Val Asp Thr Ser Thr Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Gly Val Thr Phe Asp Tyr Trp Gly Gln Gly Thr Thr Val Thr
                100                 105                 110

Val Ser Ser
        115

<210> SEQ ID NO 4
<211> LENGTH: 115
<212> TYPE: PRT
<213> ORGANISM: Artificial Sequence
<220> FEATURE:
<223> OTHER INFORMATION: Synthetic: hD11-H3

<400> SEQUENCE: 4

Gln Val Gln Leu Val Gln Ser Gly Ala Glu Val Lys Lys Pro Gly Ala
1               5                   10                  15

Ser Leu Lys Ile Ser Cys Lys Gly Ser Gly Tyr Thr Phe Thr Asp Tyr
                20                  25                  30

Ala Met His Trp Val Arg Gln Ala Pro Gly Gln Gly Leu Glu Trp Ile
            35                  40                  45

Gly Val Ile Ser Thr Tyr Ser Gly Asp Ala Ile Tyr Ala Gln Lys Phe
        50                  55                  60

Gln Gly Arg Ala Thr Met Thr Val Asp Thr Ser Thr Ser Thr Ala Tyr
65                  70                  75                  80

Leu Glu Leu Ser Ser Leu Arg Ser Glu Asp Thr Ala Val Tyr Tyr Cys
                85                  90                  95

Ala Arg Gly Val Thr Phe Asp Tyr Trp Gly Gln Gly Thr Thr Val Thr
                100                 105                 110

Val Ser Ser
        115

<210> SEQ ID NO 5
<211> LENGTH: 115
<212> TYPE: PRT
<213> ORGANISM: Artificial Sequence
<220> FEATURE:
<223> OTHER INFORMATION: Synthetic: hD11-H2b

<400> SEQUENCE: 5

Gln Val Gln Leu Val Gln Ser Gly Ala Glu Val Lys Lys Pro Gly Ala
1               5                   10                  15

Ser Val Lys Val Ser Cys Lys Gly Ser Gly Tyr Thr Phe Thr Asp Tyr
                20                  25                  30
```

Ala Met His Trp Val Arg Gln Ala Pro Gly Gln Gly Leu Glu Trp Met
            35                  40                  45

Gly Val Ile Ser Thr Tyr Ser Gly Asp Ala Ile Tyr Ala Gln Lys Phe
        50                  55                  60

Gln Gly Arg Val Thr Met Thr Val Asp Lys Ser Thr Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Gly Val Thr Phe Asp Tyr Trp Gly Gln Gly Thr Thr Val Thr
            100                 105                 110

Val Ser Ser
        115

<210> SEQ ID NO 6
<211> LENGTH: 115
<212> TYPE: PRT
<213> ORGANISM: Artificial Sequence
<220> FEATURE:
<223> OTHER INFORMATION: Synthetic: hD11-H3b

<400> SEQUENCE: 6

Gln Val Gln Leu Val Gln Ser Gly Ala Glu Val Lys Lys Pro Gly Ala
1               5                   10                  15

Ser Leu Lys Ile Ser Cys Lys Gly Ser Gly Tyr Thr Phe Thr Asp Tyr
            20                  25                  30

Ala Met His Trp Val Arg Gln Ala Pro Gly Gln Gly Leu Glu Trp Ile
            35                  40                  45

Gly Val Ile Ser Thr Tyr Ser Gly Asp Ala Ile Tyr Ala Gln Lys Phe
        50                  55                  60

Gln Gly Arg Ala Thr Met Thr Val Asp Lys Ser Thr Ser Thr Ala Tyr
65                  70                  75                  80

Leu Glu Leu Ser Ser Leu Arg Ser Glu Asp Thr Ala Val Tyr Tyr Cys
                85                  90                  95

Ala Arg Gly Val Thr Phe Asp Tyr Trp Gly Gln Gly Thr Thr Val Thr
            100                 105                 110

Val Ser Ser
        115

<210> SEQ ID NO 7
<211> LENGTH: 107
<212> TYPE: PRT
<213> ORGANISM: Artificial Sequence
<220> FEATURE:
<223> OTHER INFORMATION: Synthetic: D11- VL

<400> SEQUENCE: 7

Asp Ile Gln Met Thr Gln Thr Thr Ser Ser Leu Ser Ala Ser Leu Gly
1               5                   10                  15

Asp Arg Val Thr Ile Thr Cys Arg Ala Ser Gln Asp Ile Ser Asn Tyr
            20                  25                  30

Leu Glu Trp Tyr Gln Gln Lys Gln Gly Lys Ser Pro Gln Leu Leu Val
            35                  40                  45

Tyr Asn Ala Lys Thr Leu Ala Glu Gly Val Pro Ser Arg Phe Ser Gly
        50                  55                  60

Ser Gly Ser Gly Thr Gln Phe Ser Leu Lys Ile Asn Ser Leu Gln Pro
65                  70                  75                  80

Glu Asp Phe Gly Ser Tyr Tyr Cys Gln His His Tyr Asp Thr Pro Tyr

```
                    85                  90                  95

Thr Phe Gly Gly Gly Thr Lys Leu Glu Ile Lys
            100                 105

<210> SEQ ID NO 8
<211> LENGTH: 107
<212> TYPE: PRT
<213> ORGANISM: Artificial Sequence
<220> FEATURE:
<223> OTHER INFORMATION: Synthetic: hD11-L1

<400> SEQUENCE: 8

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile Ser Asn Tyr
            20                  25                  30

Leu Glu Trp Tyr Gln Gln Lys Pro Gly Lys Ala Pro Lys Leu Leu Ile
        35                  40                  45

Tyr Asn Ala Lys Thr Leu Ala Glu Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln His His Tyr Asp Thr Pro Tyr
                85                  90                  95

Thr Phe Gly Gln Gly Thr Lys Leu Glu Ile Lys
            100                 105

<210> SEQ ID NO 9
<211> LENGTH: 107
<212> TYPE: PRT
<213> ORGANISM: Artificial Sequence
<220> FEATURE:
<223> OTHER INFORMATION: Synthetic: hD11-L2

<400> SEQUENCE: 9

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile Ser Asn Tyr
            20                  25                  30

Leu Glu Trp Tyr Gln Gln Lys Pro Gly Lys Ala Pro Lys Leu Leu Val
        35                  40                  45

Tyr Asn Ala Lys Thr Leu Ala Glu Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Gly Thr Tyr Tyr Cys Gln His His Tyr Asp Thr Pro Tyr
                85                  90                  95

Thr Phe Gly Gln Gly Thr Lys Leu Glu Ile Lys
            100                 105

<210> SEQ ID NO 10
<211> LENGTH: 8
<212> TYPE: PRT
<213> ORGANISM: Artificial Sequence
<220> FEATURE:
<223> OTHER INFORMATION: Synthetic: VH CDR1

<400> SEQUENCE: 10

Gly Tyr Thr Phe Thr Asp Tyr Ala
1               5
```

-continued

```
<210> SEQ ID NO 11
<211> LENGTH: 8
<212> TYPE: PRT
<213> ORGANISM: Artificial Sequence
<220> FEATURE:
<223> OTHER INFORMATION: Synthetic: VH CDR2

<400> SEQUENCE: 11

Ile Ser Thr Tyr Ser Gly Asp Ala
1               5

<210> SEQ ID NO 12
<211> LENGTH: 8
<212> TYPE: PRT
<213> ORGANISM: Artificial Sequence
<220> FEATURE:
<223> OTHER INFORMATION: Synthetic: VH CDR3

<400> SEQUENCE: 12

Ala Arg Gly Val Thr Phe Asp Tyr
1               5

<210> SEQ ID NO 13
<211> LENGTH: 6
<212> TYPE: PRT
<213> ORGANISM: Artificial Sequence
<220> FEATURE:
<223> OTHER INFORMATION: Synthetic: VL CDR1

<400> SEQUENCE: 13

Gln Asp Ile Ser Asn Tyr
1               5

<210> SEQ ID NO 14
<211> LENGTH: 3
<212> TYPE: PRT
<213> ORGANISM: Artificial Sequence
<220> FEATURE:
<223> OTHER INFORMATION: Synthetic: VL CDR2

<400> SEQUENCE: 14

Asn Ala Lys
1

<210> SEQ ID NO 15
<211> LENGTH: 9
<212> TYPE: PRT
<213> ORGANISM: Artificial Sequence
<220> FEATURE:
<223> OTHER INFORMATION: Synthetic: VL CDR3

<400> SEQUENCE: 15

Gln His His Tyr Asp Thr Pro Tyr Thr
1               5
```

US 12,473,368 B2

CD25 ANTIBODIES

CROSS-REFERENCE TO RELATED APPLICATIONS

This application claims priority to U.S. Provisional Application Ser. No. 63/113,784, filed Nov. 13, 2020, the entire contents of which are incorporated herein by reference.

TECHNICAL FIELD OF THE INVENTION

The present invention relates in general to the field of MHC-Class II restricted T cell Receptors, and more particularly, to T cell Receptors specific for the KRAS G12>V activating mutation.

INCORPORATION-BY-REFERENCE OF MATERIALS FILED ON COMPACT DISC

The present application includes a Sequence Listing which has been submitted in ASCII format via EFS-Web and is hereby incorporated by reference in its entirety. Said ASCII copy, created on Nov. 11, 2021, is named RUBR1002.txt and is 10,954 bytes in size.

BACKGROUND OF THE INVENTION

CD25 is the alpha chain of the interleukin-2 (IL-2) receptor and is a transmembrane protein present on regulatory T cells, and activated T cells. In a normal state, regulatory T cells constitutively express CD25 and act to suppress the expansion of effector T cells. Regulatory T cells maintain the healthy state and inhibit effector T cells from reacting against self antigens or over-reacting to foreign antigens. In a normal, protective immune response, effector T cells multiply after contact with a foreign antigen and overcome inhibition by regulatory T cells. In the case of proliferative diseases, however, cancer cells disable the healthy immune response by increasing the amount of regulatory T cells and thereby limiting the generation of effector T cells against them. Additional molecular tools to alter the proliferation of CD25-expressing regulatory T cells are needed, for example to dampen the immune system for use in cancer therapies or to upregulate the immune system for use in autoimmune diseases. Provided herein are such tools.

SUMMARY

Provided herein are humanized antibodies that specifically bind to CD25 (interchangeably referred to herein as anti-CD25 antibodies and CD25 antibodies). In some embodiments, the antibodies are humanized. Also provided herein are methods of using and methods of making the antibodies described. For example, the CD25 antibodies may be used therapeutically to treat cancer, comprising administering to a subject in need thereof an antibody or a pharmaceutical composition thereof. Also provided are methods of producing the CD25 antibodies described herein.

As embodied and broadly described herein, an aspect of the present disclosure relates to a humanized antibody that binds human CD25, wherein the antibody comprises a variable heavy chain amino acid sequence selected from the group consisting of SEQ ID NO: 2, SEQ ID NO: 3, SEQ ID NO: 4, SEQ ID NO: 5, and SEQ ID NO: 6 or a sequence comprising at least 70% sequence identity thereto; and comprises a variable light chain amino acid sequence selected from the group consisting of SEQ ID NO: 8 and SEQ ID NO: 9, or a sequence comprising at least 70% sequence identity thereto. In one aspect, the antibody comprises a variable heavy chain amino acid sequence of SEQ ID NO: 2, or a sequence comprising at least 70% sequence identity thereto; and comprises a variable light chain amino acid sequence of SEQ ID NO: 8 or 9, or a sequence comprising at least 70%, 75%, 80%, 85%, 90%, 95%, or even 99% sequence identity thereto. In another aspect, the antibody comprises a variable heavy chain amino acid sequence of SEQ ID NO: 3, or a sequence comprising at least 70% sequence identity thereto; and comprises a variable light chain amino acid sequence of SEQ ID NO: 8 or 9, or a sequence comprising at least 70%, 75%, 80%, 85%, 90%, 95%, or even 99% sequence identity thereto. In another aspect, the antibody comprises a variable heavy chain amino acid sequence of SEQ ID NO: 4, or a sequence comprising at least 70% sequence identity thereto; and comprises a variable light chain amino acid sequence of SEQ ID NO: 8 or 9, or a sequence comprising at least 70%, 75%, 80%, 85%, 90%, 95%, or even 99% sequence identity thereto. In another aspect, the antibody comprises a variable heavy chain amino acid sequence of SEQ ID NO: 5, or a sequence comprising at least 70% sequence identity thereto; and comprises a variable light chain amino acid sequence of SEQ ID NO: 8 or 9, or a sequence comprising at least 70%, 75%, 80%, 85%, 90%, 95%, or even 99% sequence identity thereto. In another aspect, the antibody comprises a variable heavy chain amino acid sequence of SEQ ID NO: 6, or a sequence comprising at least 70% sequence identity thereto; and comprises a variable light chain amino acid sequence of SEQ ID NO: 8 or 9, or a sequence comprising at least 70%, 75%, 80%, 85%, 90%, 95%, or even 99% sequence identity thereto.

As embodied and broadly described herein, an aspect of the present disclosure relates to a humanized CD25 antibody comprising a variable light chain comprising the CDR sequences of SEQ ID NO: 13, SEQ ID NO: 14, and SEQ ID NO: 15, wherein the antibody further comprises one or more mutations to the framework region, including one or more bolded residues in SEQ ID NO: 8, and SEQ ID NO: 9.

As embodied and broadly described herein, an aspect of the present disclosure relates to humanized CD25 antibody comprising a variable heavy chain comprising the CDR sequences of SEQ ID NO: 10, SEQ ID NO: 11, and SEQ ID NO: 12, wherein the antibody further comprises one or more mutations to the framework region, including one or more bolded residues in SEQ ID NO: 2, SEQ ID NO: 3, SEQ ID NO: 4, SEQ ID NO: 5, and SEQ ID NO: 6.

As embodied and broadly described herein, an aspect of the present disclosure relates to humanized CD25 antibody comprising a variable heavy chain comprising the CDR sequences of SEQ ID NO: 10, SEQ ID NO: 11, and SEQ ID NO: 12, wherein the antibody further comprises one or more mutations to the framework region, including one or more bolded residues in SEQ ID NO: 2, SEQ ID NO: 3, SEQ ID NO: 4, SEQ ID NO: 5, and SEQ ID NO: 6; and further comprising a variable light chain comprising the CDR sequences of SEQ ID NO: 13, SEQ ID NO: 14, and SEQ ID NO: 15, wherein the antibody further comprises one or more mutations to the framework region, including one or more bolded residues in SEQ ID NO: 8, and SEQ ID NO: 9. In another aspect, the antibody binds human CD25 and cynomolgous monkey CD25. In another aspect, the EC50 ratio of binding to human CD25 and cynomolgous monkey CD25 is from about 0.75 to about 1.25. In another aspect, the antibody is afucosylated.

As embodied and broadly described herein, an aspect of the present disclosure relates to pharmaceutical composition comprising a humanized antibody that binds human CD25, wherein the antibody comprises a variable heavy chain amino acid sequence selected from the group consisting of SEQ ID NO: 2, SEQ ID NO: 3, SEQ ID NO: 4, SEQ ID NO: 5, and SEQ ID NO: 6 or a sequence comprising at least 70% sequence identity thereto; and comprises a variable light chain amino acid sequence selected from the group consisting of SEQ ID NO: 8 and SEQ ID NO: 9, or a sequence comprising at least 70% sequence identity thereto.

As embodied and broadly described herein, an aspect of the present disclosure relates to nucleic acid sequence encoding a humanized antibody that binds human CD25, wherein the antibody comprises a variable heavy chain amino acid sequence selected from the group consisting of SEQ ID NO: 2, SEQ ID NO: 3, SEQ ID NO: 4, SEQ ID NO: 5, and SEQ ID NO: 6 or a sequence comprising at least 70% sequence identity thereto; and comprises a variable light chain amino acid sequence selected from the group consisting of SEQ ID NO: 8 and SEQ ID NO: 9, or a sequence comprising at least 70% sequence identity thereto.

As embodied and broadly described herein, an aspect of the present disclosure relates to vector comprising the nucleic acid sequence of a humanized antibody that binds human CD25, wherein the antibody comprises a variable heavy chain amino acid sequence selected from the group consisting of SEQ ID NO: 2, SEQ ID NO: 3, SEQ ID NO: 4, SEQ ID NO: 5, and SEQ ID NO: 6 or a sequence comprising at least 70% sequence identity thereto; and comprises a variable light chain amino acid sequence selected from the group consisting of SEQ ID NO: 8 and SEQ ID NO: 9, or a sequence comprising at least 70% sequence identity thereto.

As embodied and broadly described herein, an aspect of the present disclosure relates to a method of treating a subject in need thereof comprising administering to the subject a therapeutically effective amount of a humanized antibody that binds human CD25, wherein the antibody comprises a variable heavy chain amino acid sequence selected from the group consisting of SEQ ID NO: 2, SEQ ID NO: 3, SEQ ID NO: 4, SEQ ID NO: 5, and SEQ ID NO: 6 or a sequence comprising at least 70% sequence identity thereto; and comprises a variable light chain amino acid sequence selected from the group consisting of SEQ ID NO: 8 and SEQ ID NO: 9, or a sequence comprising at least 70% sequence identity thereto.

As embodied and broadly described herein, an aspect of the present disclosure relates to a method of depleting the number of regulatory T cells in a subject comprising administering to the subject a therapeutically effective amount of a humanized antibody that binds human CD25, wherein the antibody comprises a variable heavy chain amino acid sequence selected from the group consisting of SEQ ID NO: 2, SEQ ID NO: 3, SEQ ID NO: 4, SEQ ID NO: 5, and SEQ ID NO: 6 or a sequence comprising at least 70% sequence identity thereto; and comprises a variable light chain amino acid sequence selected from the group consisting of SEQ ID NO: 8 and SEQ ID NO: 9, or a sequence comprising at least 70% sequence identity thereto or a pharmaceutical composition thereof. In one aspect, the subject suffers from cancer. In another aspect, the subject suffers from an autoimmune-related disease or disorder.

As embodied and broadly described herein, an aspect of the present disclosure relates to method of depleting the number of regulatory T cells in a sample comprising peripheral blood mononuclear cells comprising contacting the sample with a humanized antibody that binds human CD25, wherein the antibody comprises a variable heavy chain amino acid sequence selected from the group consisting of SEQ ID NO: 2, SEQ ID NO: 3, SEQ ID NO: 4, SEQ ID NO: 5, and SEQ ID NO: 6 or a sequence comprising at least 70% sequence identity thereto; and comprises a variable light chain amino acid sequence selected from the group consisting of SEQ ID NO: 8 and SEQ ID NO: 9, or a sequence comprising at least 70% sequence identity thereto.

As embodied and broadly described herein, an aspect of the present disclosure relates to a kit comprising a humanized antibody that binds human CD25, wherein the antibody comprises a variable heavy chain amino acid sequence selected from the group consisting of SEQ ID NO: 2, SEQ ID NO: 3, SEQ ID NO: 4, SEQ ID NO: 5, and SEQ ID NO: 6 or a sequence comprising at least 70% sequence identity thereto; and comprises a variable light chain amino acid sequence selected from the group consisting of SEQ ID NO: 8 and SEQ ID NO: 9, or a sequence comprising at least 70% sequence identity thereto or a pharmaceutical composition thereof.

DESCRIPTION OF THE DRAWINGS

The present application can be understood by reference to the following description taken in conjunction with the accompanying figures.

DETAILED DESCRIPTION

Figure 1:
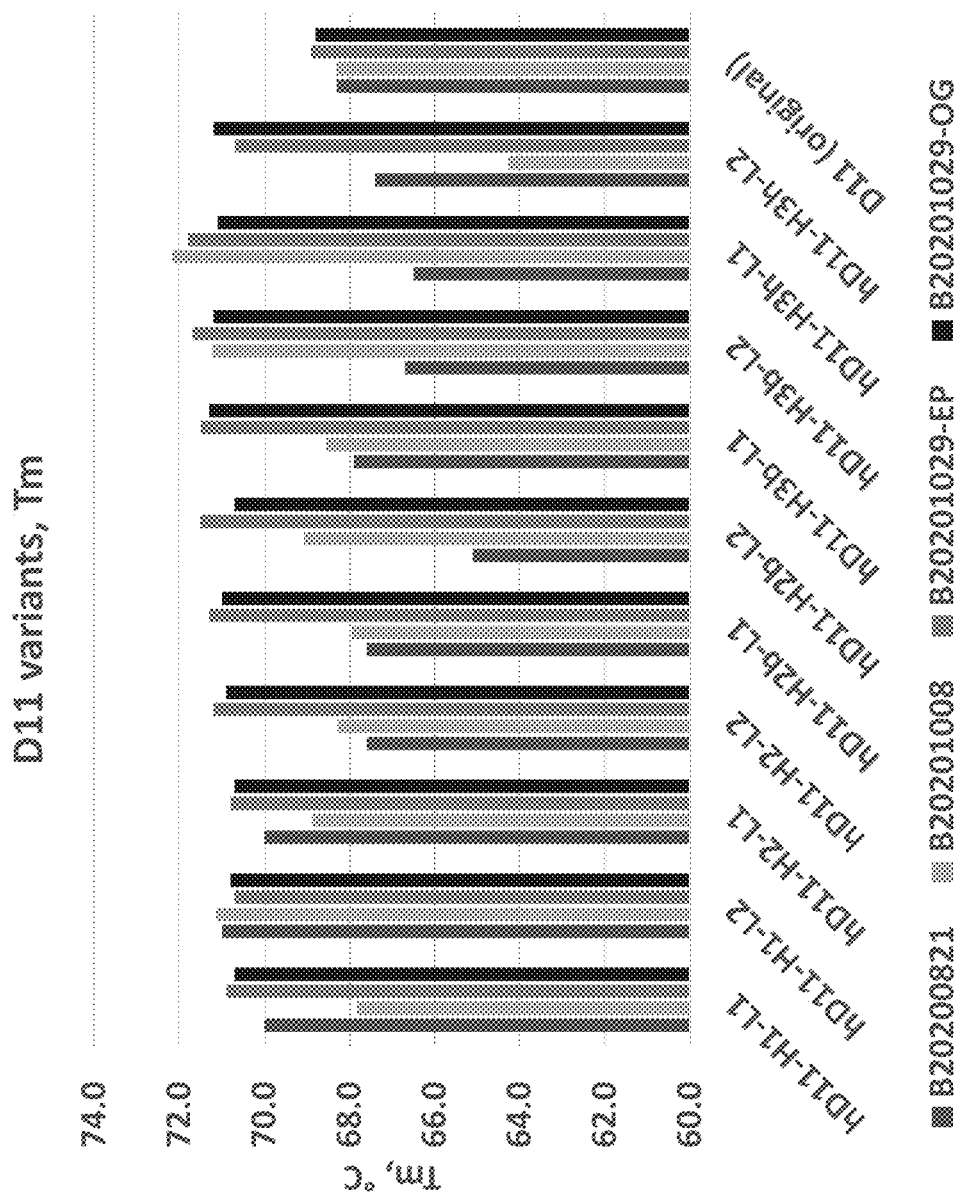
FIG. 1 shows a nanoDSF-based measurement of the Tm of D11 and the D11 variants of the disclosure, across four separate production batches. The variants show a trend for a higher Tm, when compared to D11.

Provided herein are antibodies that specifically bind to CD25. The antibodies may be human, chimeric or humanized. Also provided herein are methods of use and methods of making the antibodies described. For example, the CD25 antibodies may be used therapeutically to treat cancer, comprising administering to a subject in need thereof an antibody or a pharmaceutical composition thereof. Also provided are methods of producing the CD25 antibodies described herein.

Definitions

Unless defined otherwise herein, all technical and scientific terms used herein have the same meaning as commonly understood by one of ordinary skill in the art to which this invention belongs. Any methods and materials similar or equivalent to those described herein can be used in the practice or testing of the present invention, exemplary methods and materials are described.

The headings provided herein are not limitations of the various aspects or embodiments of the invention. Accordingly, the terms defined immediately below are more fully defined by reference to the specification as a whole.

Numeric ranges are inclusive of the numbers defining the range.

The term antibody, as used herein, includes but is not limited to a monoclonal antibody, polyclonal antibody, human antibody, humanized antibody, non-human antibody, chimeric antibody, monovalent antibody and antigen-binding fragments of the antibody (e.g Fab fragment, a Fab'2 fragment, or a scFV). Also provided herein are antibody-drug conjugates, bispecific antibodies, and multispecific antibodies that exhibit specificity for CD25. A non-human antibody (e.g. a mouse antibody) may be "humanized" using conventional techniques (e.g. by introducing changes in the framework region, while retaining mouse CDRs).

The terms "polynucleotide" and "nucleic acid" are used interchangeably herein, and refer to a polymeric form of nucleotides of any length, which may be ribonucleotides or deoxyribonucleotides. The terms include, but are not limited to, single-, double-, or multi-stranded DNA or RNA, genomic DNA, cDNA, DNA-RNA hybrids, or a polymer comprising purine and pyrimidine bases or other natural, chemically or biochemically modified, non-natural, or derivatized nucleotide bases. The terms encompass nucleic acids containing known analogues of natural nucleotides and having similar binding properties, and are metabolized in a manner similar to naturally-occurring nucleotides, unless specifically limited or stated otherwise.

When a nucleic acid or amino acid sequence is said to have a certain percent "sequence identity" or "identity" or is a certain percent "identical" to another nucleic acid or amino acid sequence, that percentage of bases or amino acids are the same, and in the same relative position, when the sequences are aligned, when comparing the two sequences.

The terms "individual," "subject," and "patient" are used interchangeably herein and refer to any subject for whom treatment or therapy is desired. The subject may be a mammalian subject. Mammalian subjects include, e.g., humans, non-human primates, rodents, (e.g., rats, mice), lagomorphs (e.g., rabbits), ungulates (e.g., cows, sheep, pigs, horses, goats, and the like), etc. In some embodiments, the subject is a human. In some embodiments, the subject is a non-human primate. In some embodiments, the subject is a companion animal (e.g. cats, dogs).

Antibodies

Provided herein are humanized antibodies that specifically bind to CD25. The antibodies are may bind to the CD25 antigen either alone or when the CD25 antigen is associated with other molecules to form high affinity IL-2 receptors, typically is present on regulatory T cells.

A CD25 antibody of the disclosure can be any of a human IgA, IgD, IgE, IgG, or IgM antibody. The IgA antibody can be an IgA1 or an IgA2 antibody. The IgG antibody can be an IgG1, IgG2, IgG2a, IgG2b, IgG3 or IgG4 antibody. A combination of any of these antibodies can also be made and used. In some embodiments, the constant region is of the IgG type, e.g. of the human IgG type. In some embodiments, the constant region is of the IgG1 type, e.g. of the human IgG1 type.

In some embodiments, the CD25 antibody exhibits cross reactivity to more than one species, for example specifically binds to both human CD25 and non-human CD25, for example specifically binds to both human CD25 and cynomolgus monkey CD25. In exemplary embodiments, the binding affinity for both human and cynomolgus monkey CD25 is about equal. In some embodiments, the EC50 ratio of binding of the humanized CD25 antibody binding to human CD25 and cynomolgous monkey CD25 is from about 0.75 to about 1.25, or from about 0.8 to about 1.2, or from about 0.9 to about 1.1. In some embodiments, the ratio is approximately 1.

The KD (affinity constant) of the antibodies provided herein may range from about $10^{-5}$ to about $10^{-14}$ nM. In some embodiments the KD of the antibodies provided herein range from about $10^{-8}$ to about $10^{-12}$ nM. In exemplary embodiments, the KD of a CD25 antibody is at least about $10^{-5}$ nM, about $10^{-6}$ nM, about $10^{-7}$ nM, about $10^{-8}$ nM, about $10^{-9}$ nM, about $10^{-10}$ nM, about $10^{-11}$ nM, about $10^{-12}$ nM, about $10^{-13}$ nM, or even about $10^{-14}$ nM.

The Kd (off-rate constant) of the antibodies provided herein may range from about $10^{-2}$ to about $10^{-6}$ 1/s.

In some embodiments, the CD25 antibody exhibits the same affinity (KD) for the CD25 antigen at both physiological pH (about 7.4) and non-physiological pH. In some embodiments, the CD25 antibody exhibits the same off-rate (Kd) for the CD25 antigen at both physiological pH (about 7.4) and non-physiological pH.

In some embodiments, the CD25 antibody exhibits different affinities (different KD) for the CD25 antigen at physiological pH (about 7.4) and non-physiological pH. In some embodiments, the CD25 antibody exhibits different off-rate constants (different Kd) for the CD25 antigen at physiological pH (about 7.4) and non-physiological pH.

In some embodiments, the CD25 antibody exhibits a lower affinity (higher KD) for the CD25 antigen at physiological pH (about 7.4) than at a pH that is lower than physiological pH, for example when the pH is 7.3, 7.2, 7.1, 7.0, 6.9, 6.8, 6.7, 6.6, 6.5, 6.4, 6.3, 6.2, 6.1, or lower. In exemplary embodiments, the antibody exhibits a higher affinity for the CD25 antigen at a pH of about 6.5, when compared to the affinity at a pH of about 7.4. In some embodiments, such antibodies are useful for retaining activity, or exhibiting enhanced activity in an acidic environment, a hypoxic environment, for example a tumor microenvironment.

In some embodiments, the antibody is a non IL-2-blocking antibody (a non IL-2 blocker)—that is, the binding of the antibody to CD25 does not disrupt or prevent binding of the IL-2 ligand to CD25 (the IL-2 alpha chain), and does not affect IL-2 mediated signal transduction, e.g. signaling through the IL-2/JAK3/STAT-5 signaling pathway. In some embodiments, the antibody does not disrupt the binding of IL-2 ligand to CD25 (IL-2 alpha chain), and binds to a different epitope than where the 7G7B6 antibody binds. In some embodiments, the antibody does not disrupt the binding of the IL-2 ligand to CD25 (IL-2 alpha chain), but does disrupt the trimerization of the beta, gamma, and alpha (CD25) chains of the IL-2 receptor.

In some embodiments, the antibody is an IL-2 blocking antibody (IL-2 blocker), e.g., the antibody disrupts or prevents binding of the IL-2 ligand to the alpha, beta, and/or gamma chains of the receptor, and decreases or inhibits IL-2 mediated signal transduction. In certain embodiments, the antibody disrupts or prevents binding of the IL-2 ligand to CD25. In some embodiments, the antibody disrupts or prevents the binding of the IL-2 ligand to CD25, and binds to a different epitope than to which either daclizumab or baciliximab bind.

In some embodiments, the CD25 antibody is a partially blocking antibody (partial IL-2 blocker), and partially, but not completely, disrupts binding of the IL-2 ligand to the alpha, beta, and/or gamma chains of the IL-2 receptor (CD25), and/or partially, but not completely decreases IL-2 mediated signal transduction.

In some embodiments, the CD25 antibody disrupts or prevents heterotrimerization of the alpha, beta, and gamma IL-2 chains. In some embodiments, the antibody does not block binding of the IL-2 ligand with CD25, but does disrupt or prevent heterotrimerization of the alpha, beta, and gamma IL-2 chains. In certain embodiments, the antibody selectively binds to regulatory T cells. In other embodiments, the antibody selectively binds T effector cells.

In some embodiments, binding of the CD25 antibody leads to the depletion of regulatory T cells (Tregs), while allowing for expansion of effector T cells (Teff).

In some embodiments, the antibody binds to CD25 in the trans orientation. In other embodiments the antibody binds to CD25 in the cis orientation. In still further embodiments, the antibody is capable of binding to CD25 in either the cis or the trans configuration.

In some embodiments, the CD25 antibody exhibits greater binding affinity to CD25, as compared to the binding of 7G7B6 (anti-human CD25 with mouse IgG2a Fc receptor; IL-2 non blocker; BioXcell) to CD25.

The tables below provide exemplary sequences for the CD25 antibodies described herein. It is noted that the complementarity determining region (CDR) and framework (FR) sequences shown are based on the IMGT convention for antibody annotation. However a skilled artisan can determine other articulations of CDR and framework sequences based on the presented VH and VL sequences, using other algorithms/conventions for antibody annotation, such as Kabat and Chothia. Accordingly the CDRs and FR sequences of the disclosure are not limited to those exemplary CDRs and FR sequences annotated in the below tables, but rather the CDRs as would be understood and determined by a skilled artisan, given the sequence of the variable region.

Humanized CD25 antibody variants were generated herein. The parental (original) mouse CD25 antibody was D11, from WO2020/102591. D11 was selected and reformatted to contain a human IgG1, and used as the parental clone, for subsequent generation of the variants.

The parental D11 variable heavy chain (VH) and variable light chain (VL) amino acid sequences are provided as SEQ ID NO: 1 and SEQ ID NO: 7, respectively. The disclosure provides for additional VH variant sequences of D11 comprising the amino acid sequences of any one of SEQ ID NO: 2, SEQ ID NO: 3, SEQ ID NO: 4, SEQ ID NO: 5, and SEQ ID NO: 6, or an amino acid sequence having at least 70%, 75%, 80%, 85%, 90%, 95%, or even 99% sequence identity thereto. The disclosure also provides for additional VL variant sequences of D11 comprising the amino acid sequences of any one of SEQ ID NO: 8, and SEQ ID NO: 9, or an amino acid sequence having at least 70%, 75%, 80%, 85%, 90%, 95%, or even 99% sequence identity thereto. In some embodiments, the antibody if afucosylated.

Table 1 shows the parental D11 variable heavy chain (VH) amino acid sequence D11 VH (SEQ ID NO: 1). This is followed by amino acid sequences of exemplary humanized variants thereof: hD11-H1 (SEQ ID NO: 2); hD11-H2 (SEQ ID NO: 3); hD11-H3 (SEQ ID NO: 4; also interchangeably referred to throughout as hD11-H3h); hD11-H2b (SEQ ID NO: 5; and hD11-H3b (SEQ ID NO: 6). Underlined residues are the CDR sequences, and bolded residues are the modified residues, as compared to the amino acid sequence immediately above.

TABLE 1

| Name | VH Sequence |
| --- | --- |
| D11 VH | QIQLQQPGAELVRPGVSLKISCKGSGYTFTDYAM HWVRQSHAKSLEWIGVISTYSGDAIYNQKFKGKA TMTVDKSSSTAYLELARLTSDDSAIYYCARGVTF DYWGQGTTVTVSS (SEQ ID NO: 1) |
| hD11-H1 | QVQLVQSGAEVKKPGASVKVSCKASGYTFTDYAM HWVRQAPGQGLEWMGVISTYSGDAIYAQKFQGRV TMTRDTSTSTVYMELSSLRSEDTAVYYCARGVTF DYWGQGTTVTVSS (SEQ ID NO: 2) |
| hD11-H2 | QVQLVQSGAEVKKPGASVKVSCKGSGYTFTDYAM HWVRQAPGQGLEWMGVISTYSGDAIYAQKFQGRV TMTVDTSTSTAYMELSSLRSEDTAVYYCARGVTF DYWGQGTTVTVSS (SEQ ID NO: 3) |
| hD11-H3 (or also interchangeably referred to herein as hD11-H3h) | QVQLVQSGAEVKKPGASLKISCKGSGYTFTDYAM HWVRQAPGQGLEWIGVISTYSGDAIYAQKFQGRA TMTVDTSTSTAYLELSSLRSEDTAVYYCARGVTF DYWGQGTTVTVSS (SEQ ID NO: 4) |
| hD11-H2b | QVQLVQSGAEVKKPGASVKVSCKGSGYTFTDYAM HWVRQAPGQGLEWMGVISTYSGDAIYAQKFQGRV TMTVDKSTSTAYMELSSLRSEDTAVYYCARGVTF DYWGQGTTVTVSS (SEQ ID NO: 5) |
| hD11-H3b | QVQLVQSGAEVKKPGASLKISCKGSGYTFTDYAM HWVRQAPGQGLEWIGVISTYSGDAIYAQKFQGRA TMTVDKSTSTAYLELSSLRSEDTAVYYCARGVTF DYWGQGTTVTVSS (SEQ ID NO: 6) |
| VH CDR1 | GYTFTDYA (SEQ ID NO: 10) |
| VH CDR2 | ISTYSGDA (SEQ ID NO: 11) |
| VH CDR3 | ARGVTFDY (SEQ ID NO: 12) |

Table 2 shows the parental D11 variable light chain (VL) amino acid sequence D11-VL (SEQ ID NO: 7). This is followed by amino acid sequences of the humanized variants thereof: hD11-L1 (SEQ ID NO: 8); and hD11-L2 (SEQ ID NO: 9). Underlined residues are the CDR sequences, and bolded residues are the modified residues, as compared to the amino acid sequence immediately preceding.

TABLE 2

| Name | VL Sequence |
| --- | --- |
| D11-VL | DIQMTQTTSSLSASLGDRVTITCRASQDISNYLEWYQ QKQGKSPQLLVYNAKTLAEGVPSRFSGSGSGTQFSLK INSLQPEDFGSYYCQHHYDTPYTFGGGTKLEIK (SEQ ID NO: 7) |

TABLE 2-continued

| Name | VL Sequence |
|---|---|
| hD11-L1 | DIQMTQSPSSLSASVGDRVTITCRAS<u>QDISNY</u>LEWYQ<br>QKPGKAPKLLIY<u>NAK</u>TLAEGVPSRFSGSGSGTDFTLT<br>ISSLQPEDFATYYC<u>QHHYDTPYT</u>FGQGTKLEIK<br>(SEQ ID NO: 8) |
| hD11-L2 | DIQMTQSPSSLSASVGDRVTITCRAS<u>QDISNY</u>LEWYQ<br>QKPGKAPKLLV<u>YNAK</u>TLAEGVPSRFSGSGSGTDFTLT<br>ISSLQPEDFGTYYC<u>QHHYDTPYT</u>FGQGTKLEIK<br>(SEQ ID NO: 9) |
| VL CDR1 | QDISNY (SEQ ID NO: 13) |
| VL CDR2 | NAK (SEQ ID NO: 14) |
| VL CDR3 | QHHYDTPYT (SEQ ID NO: 15) |

Accordingly, in some embodiments, provided is CD25 antibody comprising the variable heavy chain CDR sequences of SEQ ID NO: 10, SEQ ID NO: 11, and SEQ ID NO: 12 and is humanized and/or stabilized. The residues selected for humanization and/or stabilization include, but are not limited to one or more of the bolded residues in SEQ ID NO: 2, SEQ ID NO: 3, SEQ ID NO: 4, SEQ ID NO: 5, and SEQ ID NO: 6.

In some embodiments, provided is CD25 antibody comprising the variable light chain CDR sequences of SEQ ID NO: 13, SEQ ID NO: 14, and SEQ ID NO: 15 and is humanized and/or stabilized. The residues selected for humanization and/or stabilization include, but are not limited to one or more of the bolded residues in SEQ ID NO: 8 and SEQ ID NO: 9.

In some embodiments, provided is CD25 antibody comprising the variable heavy chain CDR sequences of SEQ ID NO: 10, SEQ ID NO: 11, and SEQ ID NO: 12 and a variable light chain CDR sequences of SEQ ID NO: 13, SEQ ID NO: 14, and SEQ ID NO: 15, wherein the antibody is humanized and/or stabilized. The residues selected for humanization and/or stabilization include, but are not limited to one or more of the bolded residues in SEQ ID NO: 2, SEQ ID NO: 3, SEQ ID NO: 4, SEQ ID NO: 5, SEQ ID NO: 6, SEQ ID NO: 8, and SEQ ID NO: 9. In some embodiments, the antibody is afucosylated.

Exemplary antibody VH+VL combinations of the humanized CD25 antibodies are provided below in Table 3.

TABLE 3

| Name | VH | VL |
|---|---|---|
| D11 (original or parental) | D11 (SEQ ID NO: 1) | D11 (SEQ ID NO: 7) |
| hD11-H1-L1 | hD11-H1 (SEQ ID NO: 2) | hD11-L1 (SEQ ID NO: 8) |
| hD11-H1-L2 | hD11-H1 (SEQ ID NO: 2) | hD11-L2 (SEQ ID NO: 9) |
| hD11-H2-L1 | hD11-H2 (SEQ ID NO: 3) | hD11-L1 (SEQ ID NO: 8) |
| hD11-H2-L2 | hD11-H2 (SEQ ID NO: 3) | hD11-L2 (SEQ ID NO: 9) |
| hD11-H3-L1 (hD11-H3h-L1) | hD11-H3 (SEQ ID NO: 4) (hD11-H3h) | hD11-L1 (SEQ ID NO: 8) |
| hD11-H3-L2 (hD11-H3h-L2) | hD11-H3 (SEQ ID NO: 4) (hD11-H3h) | hD11-L2 (SEQ ID NO: 9) |
| hD11-H2b-L1 | hD11-H2b (SEQ ID NO: 5) | hD11-L1 (SEQ ID NO: 8) |
| hD11-H2b-L2 | hD11-H2b (SEQ ID NO: 5) | hD11-L2 (SEQ ID NO: 9) |
| hD11-H3b-L1 | hD11-H3b (SEQ ID NO: 6) | hD11-L1 (SEQ ID NO: 8) |
| hD11-H3b-L2 | hD11-H3b (SEQ ID NO: 6) | hD11-L2 (SEQ ID NO: 9) |

In some embodiments, the CD25 antibody is conjugated, useful for a variety of purposes including, but not limited to, therapeutics and detection/diagnostics.

In some embodiments, the CD25 is antibody is fucosylated.

In some embodiments, the CD25 is antibody is afucosylated. In some embodiments, the CD25 antibody is afucosylated and leads to higher ADCC activity in cells, e.g. regulatory T cells.

Also provided herein are nucleic acid sequences encoding any of the CD25 antibodies provided herein. Also provided herein are vectors comprising any of the nucleic acids encoding the antibodies, phage comprising such vectors, and host cells comprising such vectors.

Antibody Generation and Testing

The CD25 antibodies described herein can be generated by injection of a CD25 complete or partial immunogen into an animal, e.g. a mouse or a rabbit, and subsequent humanization thereof. CD25 immunogen positive B-cells from the animal can be collected, and phage libraries generated therefrom. In some embodiments, the phage express Fab fragments of candidate CD25 antibodies. The phage can undergo multiple rounds of screening (referred to herein as phage panning), for example against successively lower concentrations of a CD25 antigen, to select for those Fab fragments capable of binding CD25 with high affinities, to be selected for further variation. The phage can be screened against CD25 antigen coated beads, or some other substrate, for example. In some embodiments, the screening is carried out a physiological pH (e.g. about pH 7.4). In other embodiments, the screening is carried out at a lower pH, for example, at a pH of about 6.5 to screen for Fab fragments capable of binding the CD25 antigen at a lower pH, for example, for use in a therapeutic context, e.g. for use in a hypoxic, acidic tumor microenvironment.

The CD25 antibodies generated herein may be tested for efficacy using a number of in vitro, in vivo, ex vivo, and/or cell-based assays.

In some embodiments, the CD25 antibodies herein can be assayed for, and further selected based on their ability to deplete regulatory T cells. In particular embodiments, the CD25 antibodies herein can be assayed for, and further selected based on their ability to deplete regulatory T cells in an acidic environment, e.g. at a pH lower than physiological pH, e.g. at pH 7.3, 7.2, 7.1, 7.0, 6.9, 6.8, 6.7, 6.6, 6.5, 6.4, 6.3, 6.2, 6.1, or lower.

In some embodiments, the CD25 antibodies herein can be assayed for, and further selected based on a pSTAT5 in vitro assay, to assay for the signaling through the IL-2/IL-2 receptor pathway, the maintenance of which indicates that the antibody is not an IL-2 blocking antibody.

In some embodiments, the CD25 antibodies herein can be assayed for using biosensor screening to characterize molecular interactions.

In some embodiments, the CD25 antibodies herein can be assayed for competition for binding against other known CD25 antibodies, with known mechanisms.

In some embodiments, the CD25 antibodies herein can be assayed for epitope specificity.

In some embodiments, the CD25 antibodies herein can be assayed for their capacity to be a non IL-2 blocker, an IL-2 blocker, or a partial IL-2 blocker.

Therapeutic Uses

Provided herein are CD25 antibodies for therapeutic use, e.g. for use in proliferative diseases or disorders such as cancer or for use in autoimmune diseases.

Accordingly provided herein are methods of treating a cancer comprising administering to a subject in need thereof a therapeutically effective amount of a therapeutic CD25 antibody. In some embodiments, the cancer is a primary cancer. In some embodiments, the cancer is a metastatic cancer. In some embodiments, the cancer involves a solid tumor; in other embodiments, the cancer involves a liquid tumor, e.g. a blood based cancer. In exemplary embodiments, the CD25 antibody is a non IL-2 blocking antibody.

Accordingly provided herein are methods of treating an autoimmune-related disease or disorder comprising administering to a subject in need thereof a therapeutically effective amount of a therapeutic CD25 antibody. In exemplary embodiments, the CD25 antibody is an IL-2 blocking antibody.

As used herein, a subject refers to any animal classified as a mammal, including humans, domestic and farm animals, and zoo, sport, or pet animals, such as dogs, horses, rabbits, cattle, pigs, hamsters, gerbils, mice, ferrets, rats, cats, and the like. Subjects may be male or female.

The administration of any of the therapeutic CD25 antibodies provided herein may be administered in combination with other known drugs/treatments (e.g. small molecule drugs, or biologics. The administration may be sequential or concurrent.

In vivo administration of the therapeutic CD25 antibodies described herein may be carried out intravenously, intratumorally, intracranially, intralesionally (e.g. intralesional injection, direct contact diffusion), intracavitary (intraperitoneal, intrapleural, intrauterine, intrarectal), intraperitoneally, intramuscularly, subcutaneously, topically, orally, transdermally, by implantation, by inhalation, intrathecally, intraventricularly, or intranasally. In an exemplary embodiment, the route of administration is by intravenous injection.

A therapeutically effective amount of the therapeutic antibody will be administered. The appropriate dosage of the therapeutic antibody may be determined based on the severity of the cancer, the clinical condition of the subject, the subject's clinical history and response to the treatment, and the discretion of the attending physician The dosage amounts of the CD25 antibodies provided herein may vary from about 1 ng/kg up to about 1000 mg/kg of a subject's body weight or more per day, depending upon the route of administration. For repeated administrations over several days or longer, depending on the severity of the cancer, the treatment may be sustained until a desired suppression of symptoms is achieved. Dosage regimens may be useful, depending on the pattern of pharmacokinetic decay that the physician wishes to achieve. For example, dosing an individual from one to twenty-one times a week is provided herein. In certain embodiments, dosing frequency is three times per day, twice per day, once per day, once every other day, once weekly, once every two weeks, once every four weeks, once every five weeks, once every six weeks, once every seven weeks, once every eight weeks, once every nine weeks, once every ten weeks, or once monthly, once every two months, once every three months, or longer. Progress of the therapy is may be monitored by conventional techniques and assays. The dosing regimen may vary over time independently of the dose used.

Diagnostic Uses

The CD25 antibodies provided herein may be used for diagnostic and detection purposes. Depending on the application, the CD25 antibody may be detected and quantified in vivo or in vitro.

The CD25 antibodies provided herein are amendable for use in a variety of immunoassays. These immunoassays include, but are not limited to enzyme-linked immunosorbent assay (ELISA), Western blot, radioimmunoassay (RIA), flow cytometry, a radioimmunoassay, an immunofluorescence assay, spectrophotometry, radiography, electrophoresis, high performance liquid chromatography (HPLC), or thin layer chromatography (TLC).

The CD25 antibodies provided herein may be comprise a detectable label, for example detectable by spectroscopic, photochemical, biochemical, immunochemical, fluorescent, electrical, optical or chemical methods. Useful labels in the present disclosure include, but are not limited to fluorescent dyes, radiolabels, enzymes, colorimetric labels, avidin or biotin.

In some embodiments, the CD25 antibody is radiolabeled with an isotope, useful for imaging by nuclear medicine equipment (SPECT, PET, or scintigraphy).

Pharmaceutical Compositions

The disclosure provides compositions comprising therapeutic CD25 antibodies, In some embodiments the composition is sterile. The pharmaceutical compositions generally comprise an effective amount of the therapeutic antibody in a pharmaceutically acceptable excipient.

Kits and Articles of Manufacture

The disclosure also provides for kits comprising any of the CD25 antibodies described herein, e.g. for either therapeutic or diagnostic uses. In some embodiments, the kits further contain a component selected from any of secondary antibodies, reagents for immunohistochemistry analysis, pharmaceutically acceptable excipient and instruction manual and any combination thereof. In some embodiments, the kit comprises any one or more of the therapeutic compositions described herein, with one or more pharmaceutically acceptable excipients.

The present application also provides articles of manufacture comprising any one of the therapeutic or diagnostic compositions or kits described herein. Examples of an article of manufacture include vials (e.g. sealed vials).

The description provided herein sets forth numerous exemplary configurations, methods, parameters, and the like. It should be recognized, however, that such description is not intended as a limitation on the scope of the present disclosure, but is instead provided as a description of exemplary embodiments.

The following examples are included for illustrative purposes and are not intend to limit the scope of the invention.

EXAMPLES

Example 1: Generation of CD25 Antibody Variants

BalbC mice were injected in the tail vein with full length human CD25. The immunization protocol and subsequent selection and characterization of the resulting antibodies are described in WO2020/102591, the content of which is incorporated by reference in its entirety.

A Fab from WO2020/102591, D11, was selected and reformatted to contain a human IgG1, and used as the parental clone, for subsequent generation of variants.

Humanized variants were generated. In the data provided herein, reference to the original D11, or parental D11, or simply D11 refers to an antibody with a human IgG1 Fc and a variable heavy chain (VH) amino acid sequence comprising SEQ ID NO: 1 and a variable light chain (VL) amino acid sequence comprising SEQ ID NO: 7.

Table 1 shows the parental D11 variable heavy chain (VH) amino acid sequence D11 VH (SEQ ID NO: 1), followed by amino acid sequences of the humanized variants thereof: hD11-H1 (SEQ ID NO: 2); hD11-H2 (SEQ ID NO: 3); hD11-H3 (SEQ ID NO: 4); hD11-H2b (SEQ ID NO: 5; and hD11-H3b (SEQ ID NO: 6). Underlined residues are the CDR sequences, and bolded residues are the modified residues, as compared to the amino acid sequence immediately above.

Table 2 shows the parental D11 variable light chain (VL) amino acid sequence D11-VL (SEQ ID NO: 7), followed by amino acid sequences of the humanized variants thereof: hD11-L1 (SEQ ID NO: 8); and hD11-L2 (SEQ ID NO: 9). Underlined residues are the CDR sequences, and bolded residues are the modified residues, as compared to the amino acid sequence immediately preceding.

For the characterization and assays of the antibodies described herein, the following antibodies were used, as noted in Table 4.

TABLE 4

| Name | VH | VL |
|---|---|---|
| D11 (original or parental) | D11 (SEQ ID NO: 1) | D11 (SEQ ID NO: 7) |
| hD11-H1-L1 | hD11-H1 (SEQ ID NO: 2) | hD11-L1 (SEQ ID NO: 8) |
| hD11-H1-L2 | hD11-H1 (SEQ ID NO: 2) | hD11-L2 (SEQ ID NO: 9) |
| hD11-H2-L1 | hD11-H2 (SEQ ID NO: 3) | hD11-L1 (SEQ ID NO: 8) |
| hD11-H2-L2 | hD11-H2 (SEQ ID NO: 3) | hD11-L2 (SEQ ID NO. 9) |
| hD11-H3-L1 (hD11-H3h-L1) | hD11-H3 (SEQ ID NO: 4) | hD11-L1 (SEQ ID NO: 8) |
| hD11-H3-L2 (hD11-H3h-L2) | hD11-H3 (SEQ ID NO: 4) | hD11-L2 (SEQ ID NO: 9) |
| hD11-H2b-L1 | hD11-H2b (SEQ ID NO: 5) | hD11-L1 (SEQ ID NO: 8) |
| hD11-H2b-L2 | hD11-H2b (SEQ ID NO: 5) | hD11-L2 (SEQ ID NO: 9) |
| hD11-H3b-L1 | hD11-H3b (SEQ ID NO: 6) | hD11-L1 (SEQ ID NO: 8) |
| hD11-H3b-L2 | hD11-H3b (SEQ ID NO: 6) | hD11-L2 (SEQ ID NO: 9) |

Example 2: Characterization of CD25 Antibody Variants

Figure 2:
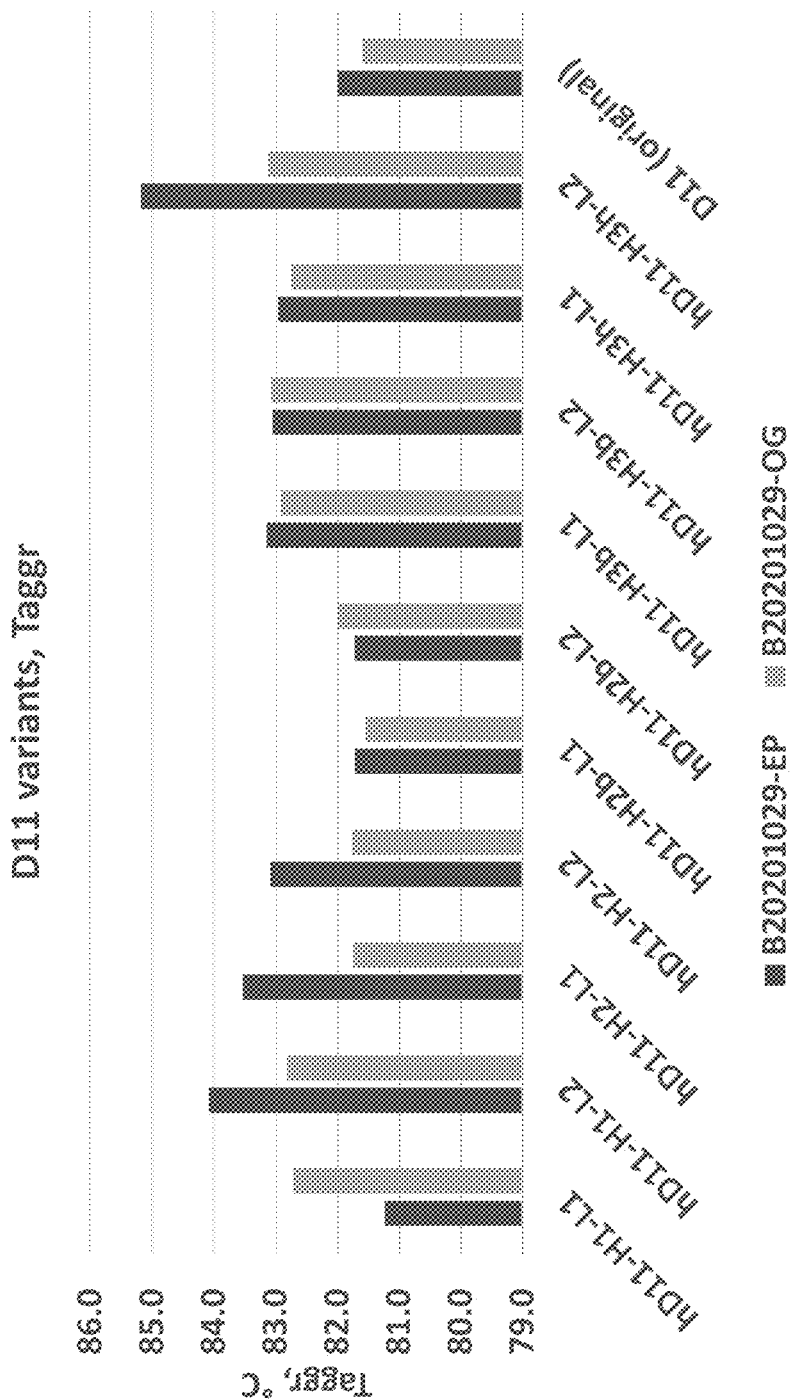
FIG. 2 shows a nanoDSF-based measurement of Tagg of D11 and the D11 variants of the disclosure, across two separate production batches. No significant aggregation was detected at lower temperatures and Tagg for humanized variants was generally higher than for the D11 starting point.

Using a Prometheus NT.Plex nanoDSF instrument, which measures the intrinsic fluorescence of proteins using tyrosine and phenylalanine residues, the melting (Tm) and aggregation behavior (Tagg) of the antibodies were measured. Prometheus NT.Plex High Sensitivity capillaries (Cat. PR-AC006) were loaded with samples at 0.2 mg/mL antibody diluted in PBS pH 7.4, 10 µl/capillary, run in duplicates. The temperature range was ramped from 20-95° C., 1° C./min over 75 min. Fluorescence was detected at 330 nm, 350 nm and the inflection point of the ratio 350/330 nm was used to determine Tm. Aggregation optics enabled measurement of scattered light and the inflection point of back-scattered light was used to determine Taggr. FIG. 1 shows a nanoDSF-based measurement of Tm of D11 and the D11 variants of the disclosure, across four separate production batches. The variants show a trend for a higher Tm, when compared to D11. FIG. 2 shows a nanoDSF-based measurement of Tagg of D11 and the D11 variants of the disclosure, across two separate production batches. No significant aggregation was detected at lower temperatures and Tagg for humanized variants was generally higher than for the D11 starting point.

Figure 3:
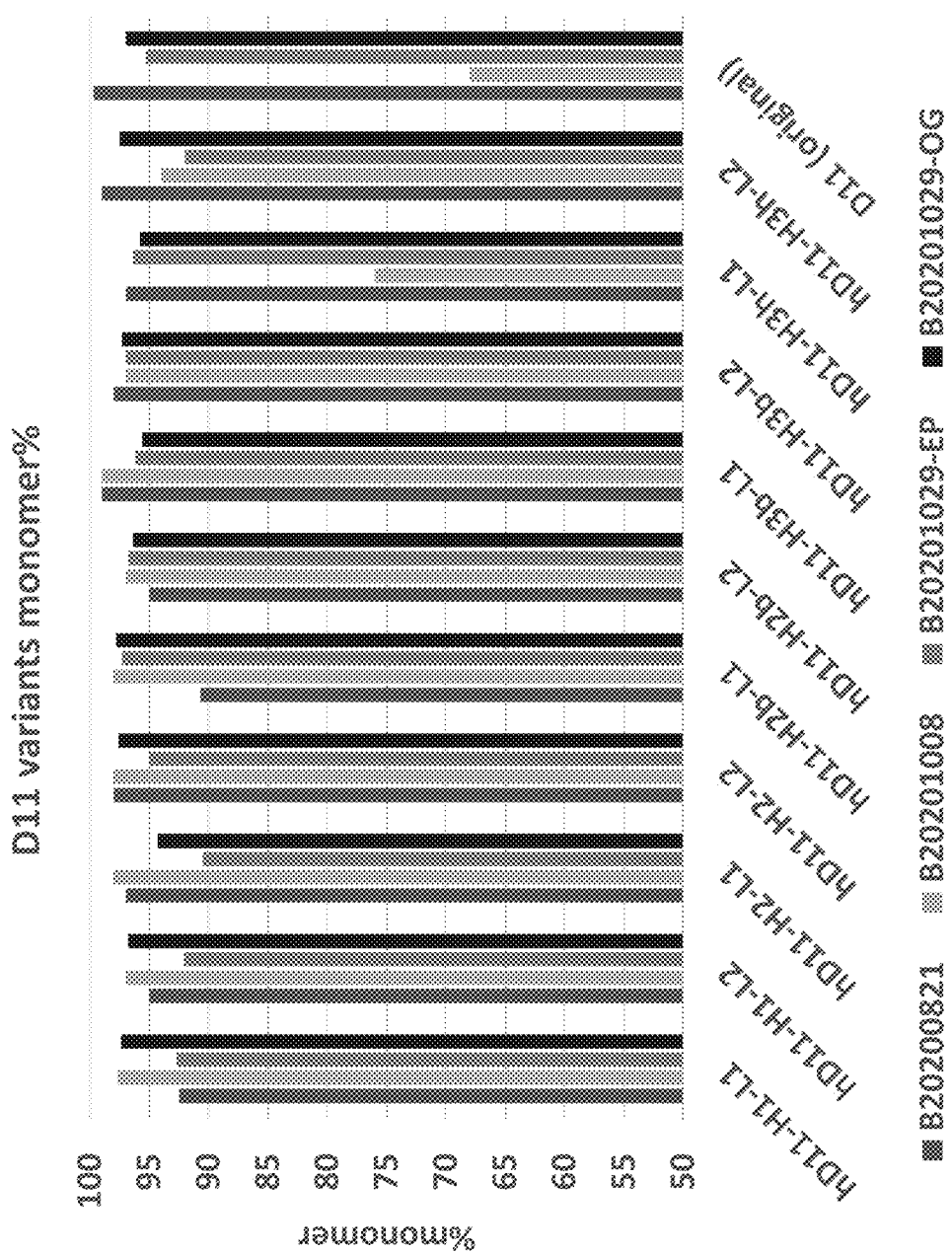
FIG. 3 shows the results of a uPLC-based measurement of purity and aggregation for D11 and the D11 variants of the disclosure, across four separate production batches. The data support consistent purification of D11 and the variants at >90% purity in a single step purification.

The humanized antibody hD11-H3h-L2 showed a higher Tagg than most, indicating superior stability and resistance to aggregation.

uPLC based measurement of purity and extent of aggregation of the humanized D11 variants was performed using Dionex UltiMate® 3000-RS UHPLC system run by Chromeleon® (ver. 7.3) software. A size exclusion column TSKgel UP-SW3000, 2 µm, 4.6 mm ID×15 cm (Tosoh) at 28° C. was used to resolve the antibodies. The mobile phase was 50 mmol Sodium Phosphate monobasic, 300 mmol Sodium Chloride, 5% Acetonitrile; pH 6.5 run in isocratic mode a flow rate of 0.2 mL/min. Proteins were detected using UV absorbance at 280 nm. All samples were injected in a volume of 20.0 µL at a concentration of 0.1 mg/mL. FIG. 3 shows the results of a uPLC-based measurement of purity and aggregation for D11 and the D11 variants of the disclosure, across four separate production batches. The data support consistent purification of D11 and the variants at >90% purity in a single step purification. Table 5 below shows the tabular data.

TABLE 5

| Antibody | Average Yield | Average % Monomer |
|---|---|---|
| hD11-H1-L1 | 0.24 | 95.1 |
| hD11-H1-L2 | 0.51 | 95.2 |
| hD11-H2-L1 | 0.21 | 95.0 |
| hD11-H2-L2 | 0.15 | 97.2 |
| hD11-H2b-L1 | 0.33 | 96.0 |
| hD11-H2b-L2 | 0.17 | 96.3 |
| hD11-H3b-L1 | 0.23 | 97.5 |
| hD11-H3b-L2 | 0.30 | 97.3 |
| hD11-H3-L1 | 0.44 | 91.3 |
| hD11-H3-L2 | 0.30 | 95.6 |
| D11 (parental) | 1.52 | 90.0 |

Example 3: Cell Binding Assays

To validate antibody binding to CD25 on cells and for specificity, two cell lines SUDHL-1 (human large diffuse histiocytic lymphoma cell lines, ATCC) and SR786 cells (anaplastic large T cell lymphoma cells) were used to test for CD25 binding. Both are CD25 expressing cell lines. For each cell line, 100,000 cells were plated in a 96 well round bottom plate in cell buffer (PBS+ 2% HI FBS) and centrifuged. Antibody concentrations from 1-10 ug/mL were used to test the binding of each antibody. Cell were resuspended in 100 uL of antibodies/well and incubated for 20 minutes on ice. After incubation, cells were centrifuged at 300×g for 5 minutes at room temperature, and resuspended and washed with ice cold cell buffer. Cells were then stained with an anti-human Fc secondary antibody conjugated to AF647 (Biolegend) and incubated on ice for 20 min in the dark. Cells were centrifuged, washed and resuspended in cold cell buffer with DAPI and analyzed using flow cytometry (Cytoflex, Becton Dickinson). DAPI+ cell were excluded from analysis. The mean fluorescence intensity was calculated using the median (FlowJo, TreeStar).

Figure 4:
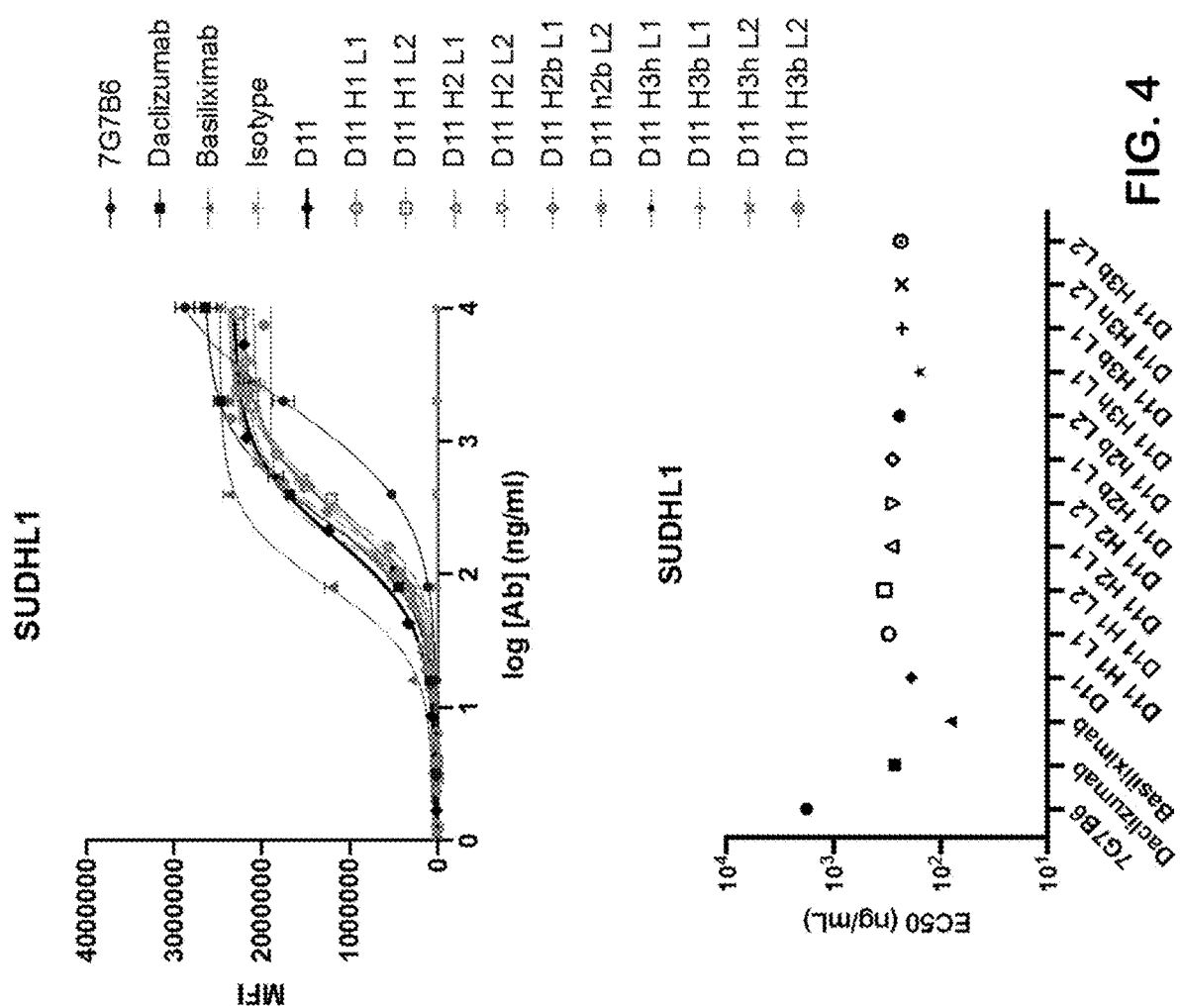
FIG. 4 shows that the binding of the D11 variants of the disclosure display no difference in binding to CD25-expressing SUDHL1 cells, when compared to D11.
Figure 5:
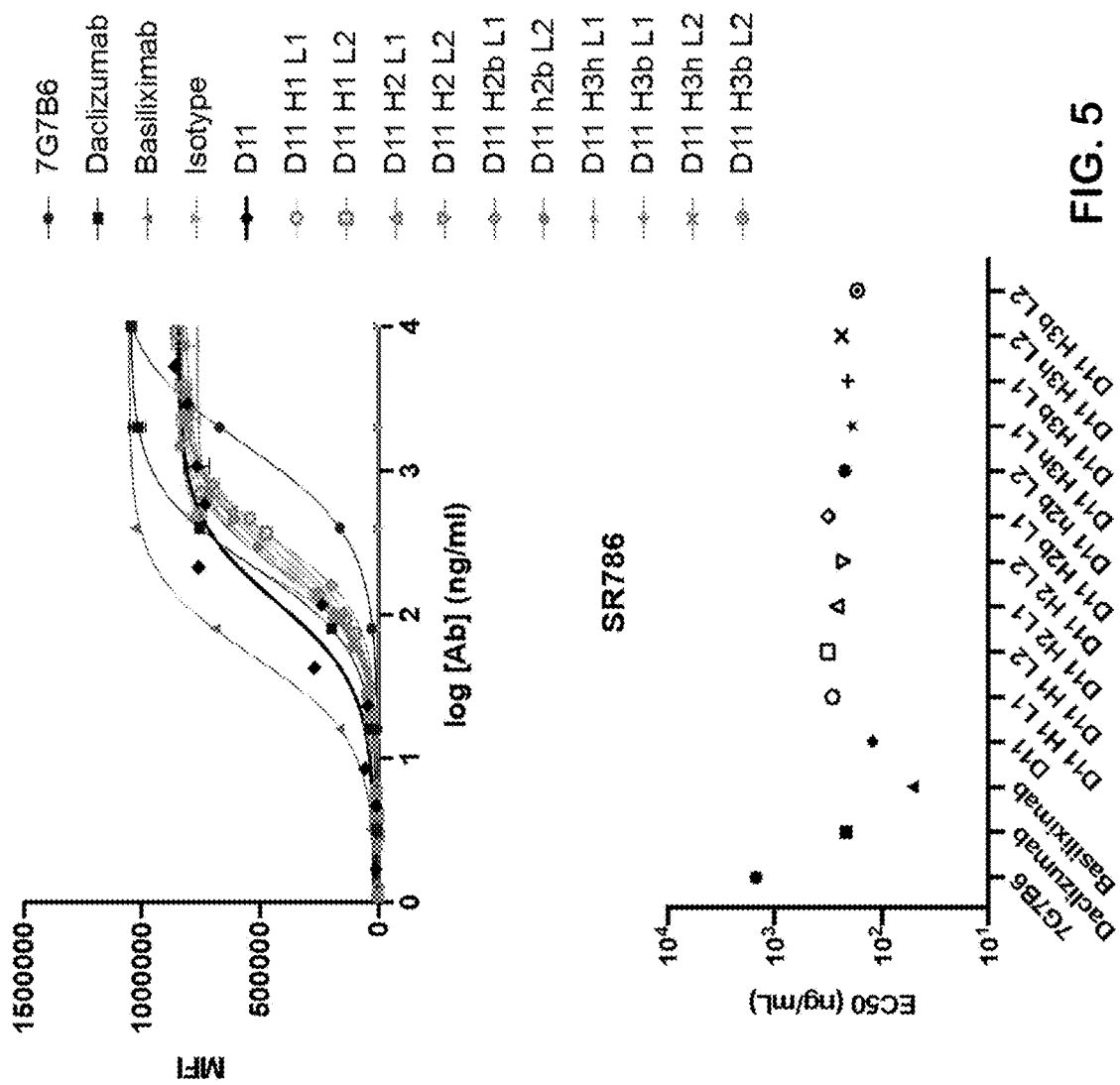
FIG. 5 shows that the binding of the D11 variants of the disclosure display no difference in binding to CD25-expressing SR786 cells, when compared to D11.

FIG. 4 shows that the binding of the D11 variants of the disclosure display no difference in binding to CD25-expressing SUDHL1 cells, when compared to parental D11. FIG. 5 shows that the binding of the D11 variants of the disclosure display no difference in binding to CD25-expressing SR786 cells, when compared to D11. Binding was also compared to commercially available control antibodies, 767B6, Daclizumab, and Basiliximab, no significant differences were observed.

Example 4: Recombinant CD25 Cynomolgus Monkey Binding of CD25 Antibodies

To test for binding to recombinant cynomolgus monkey (cyno) CD25, microtiter plates were coated with 80 ul of 1 ug/ml Cyno CD25 in 50 mM sodium carbonate pH 9.6) at 4° C. overnight. The next day, remove the protein from the wells and block with 200 ul PBS/0.1% BSA/0.05% tween20. The plate was incubated for 1 hour at room temperature. The antibodies starting at 25 nM and 3 fold serially were diluted in PBT buffer and added to the plate for incubation at RT for 1 hour. The plate was then washed and then 1:2500 dilution of HRP conjugate anti-Fab antibody was added. The plate was washed 5-10 times with PBS/tween20 to remove non-specific binders. TMB perxidase substrate and peroxidase solution were added and incubated for the time needed to develop with 80 uL of ELISA stop solution added at the end. OD measurements were then taken at 450 nM using a plate reader (SpectraMax iD3 Plate Reader, Molecular Devices).

Figure 6:
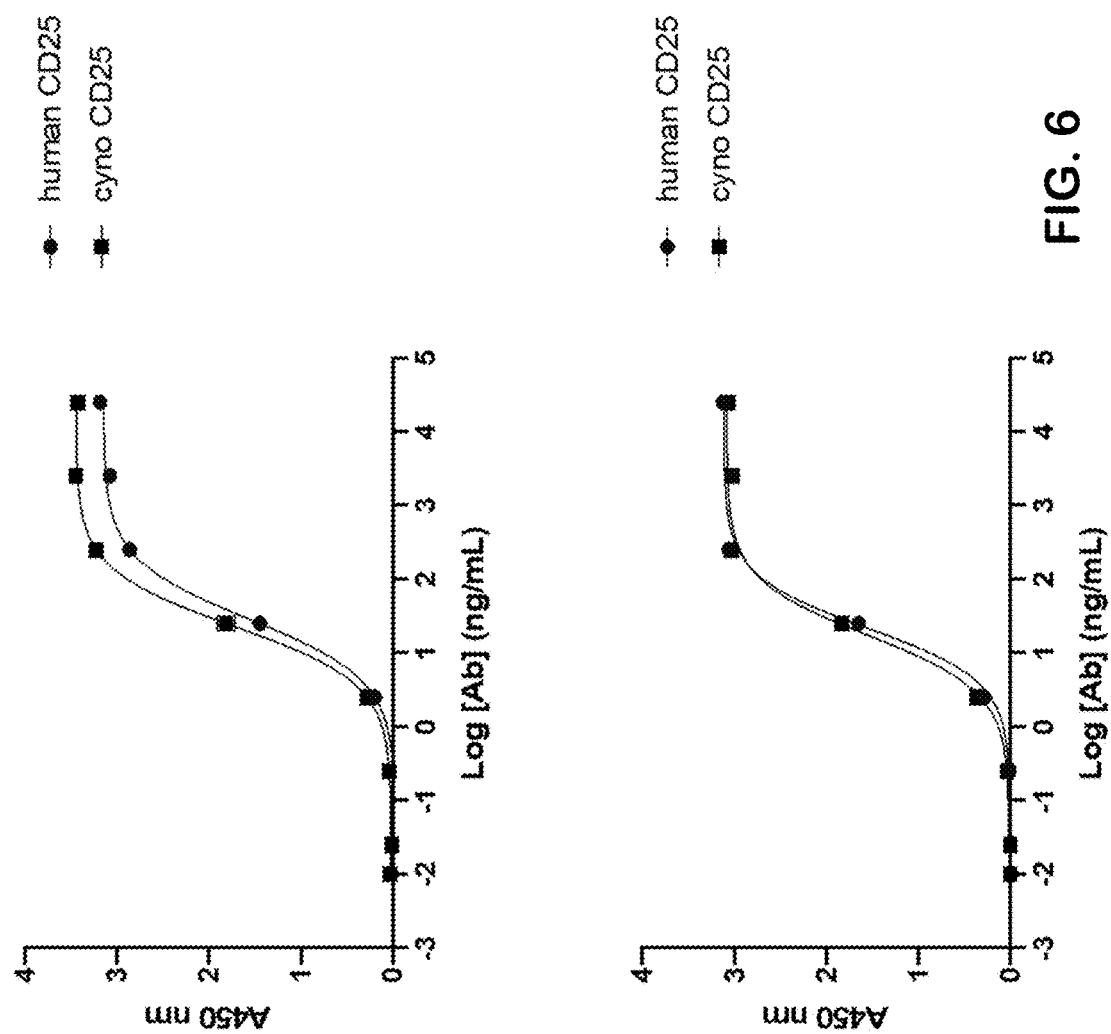
FIG. 6 shows that the D11 variant H3h-L2 (interchangeably referred to herein as H3-L2) maintains approximately equal cross reactivity with both human CD25 and cynomolgus monkey CD25.

FIG. 6 shows that the D11 variant H3h-L2 (H3-L2) maintains cross reactivity with both human CD25 and cynomolgus monkey CD25. Table 6 shows quantification of the same, along with the cyno/human binding ratio. Dac stands for Daclizumab. The ratio is indicative of a preference in binding to either cyno or human CD25. The variant H3h-L2 (H3-L2) shows an equal cross reactivity, while other variants show a clear preference for one or the other species (e.g. variant H1-L2).

TABLE 6

| | Human | | | Cyno/ | Cyno | | | |
|---|---|---|---|---|---|---|---|---|
| | Top | HillSlope | IC50 | Human | | Top | HillSlope | IC50 |
| Dac | 3.237 | 1.108 | 4.463 | 2.1 | Dac | 3.124 | 0.951 | 9.214 |
| 7G7B6 | 3.121 | 0.9691 | 21.34 | 1.8 | 7G7B6 | 2.963 | 0.979 | 38.65 |
| D11 | 3.125 | 1.235 | 19.86 | 1.3 | D11 | 3.013 | 1.381 | 25.38 |
| H1-L2 | 3.098 | 1.008 | 54.6 | 42.4 | H1-L2 | 3.043 | 1.086 | 2316 |
| H2b-L1 | 3.146 | 1.112 | 20.46 | 0.4 | H2b-L1 | 3.045 | 1.001 | 9.145 |
| H2b-L1 | 2.893 | 1.11 | 14.69 | 1.3 | H2b-L1 | 2.822 | 1.088 | 18.97 |
| H3b-L2 | 2.848 | 1.26 | 25.39 | 4.8 | H3b-L2 | 2.538 | 1.211 | 122.8 |
| H3b-L2 | 2.947 | 1.032 | 24.05 | 6.2 | H3b-L2 | 2.758 | 1.032 | 148.6 |
| H3h-L1 | 2.924 | 1.057 | 26.41 | 5.9 | H3h-L1 | 2.626 | 0.9896 | 155.1 |
| H3h-L1 | 3.075 | 1.221 | 29.28 | 8.5 | H3h-L1 | 2.827 | 0.9523 | 248.8 |
| H3h-L2 | 2.973 | 1.08 | 15.75 | 1.0 | H3h-L2 | 2.768 | 1.137 | 15.3 |
| H3h-L2 | 3.116 | 1.209 | 21.84 | 0.8 | H3h-L2 | 3.085 | 1.13 | 17.3 |

Example 5: Antibody-Dependent Cell Cytotoxicity (ADCC)

Functional Cell Killing Assay ADCC

One of the mechanisms for Treg (regulatory T cell) depletion is through antibody-dependent cell cytotoxicity (ADCC). This is a cell-mediated immune defense mechanism that usually causes cell death, triggered by the recognition of immune/effector cells to antibodies bound to a specific antigen on a target cell. To elicit ADCC, antibodies with the human Fc subclass, IgG1, is commonly chosen for its effector functions with the ability to bind to the three Fc receptors: FcγRI (CD64), FCγRII (CD32), and FcγRIIIA (CD16), that are expressed on immune cells such as NK cells, monocytes and granulocytes. NK cells predominantly express FcγRIIIA and considered to be the main effector cell in ADCC.

ADCC was quantified using a Lactate dehydrogenase (LDH) Cytotoxicity plate-based colorimetric assay (Thermo Fisher). In this assay, the release of LDH is proportional to the amount of cell killing. Lactate dehydrogenase (LDH) is a cytosolic enzyme, present in all cells, that is released when the plasma membrane is damaged. Extracellular LDH in the media is quantified by a coupled enzymatic reaction in which LDH catalyzes the conversion of lactate to pyruvate via NAD+ reduction to NADH. By addition of diaphorase, NADH is reduced to a tetrazolium salt (INT) to form a formazan product that can be measured at 490 nm. Controls for the assay can include the use of Rituximab (anti-CD20 antibody) on human Raji lymphoma cell line and Daclizumab on SUDHL-1 cells (both antibodies are known to induce ADCC). Additional controls can include: non-glycosylated human IgG1, as a negative control and non-fucosylated human IgG1, as a positive control. As a first initial screen, reformatted clones were tested in the ADCC assay at one concentration (10 ug/mL) using PBMCs from a single donor. Human PBMCs (ASTARTE Biologics) were thawed the day before and cultured overnight with X-VIVO 15 or 20 media (Lonza) at 37 C in 5% CO2 incubator. On the day of experiment, PBMCs and SUDHL-1 target cells were counted and resuspended in X-VIVO 15 (Lonza, phenol red) serum free medium. Antibody dilutions were prepared starting with 10 ug/ml with 5 fold serial dilutions. Target cells were then plated in a 96 well 50 μL/well in a 96-well white flat bottom opaque plate (CORNING Ref #3917) and 10 μL/well antibody dilution was added to the target cells and incubated at 37° C. and 5% CO2 incubater for 30 min. After the incubation, PBMCs were added to the target cells (50 μL/well). For control target cells for spontaneous and max LDH release calculation, 50 μL/well of assay medium (X-VIVO15, phenol red free) was added. The co-incubation (ADCC induction) was done by incubating the plate for 4 h at 37° C. and 5% CO2 incubater 45 min before the co-incubation completed, 10% Triton X100 solution (in PBS) was added to the wells to calculate Max LDH release (10 μL/well, 11× dilution factor). After the incubation, 50 μL/well of the reaction substrate was plated in a 96-well plate (clear flat bottom) and then 50 μL/well of the supernatant of the assay plate was transferred to the reaction substrate. The plate was developed in the dark at RT for 30 min. After the incubation, 50 μL/well of stop solution was added and absorbance 490 nm and 680 nm was measured by using a plate reader (SpectraMax iD3 Plate Reader, Molecular Devices).

Figure 7:
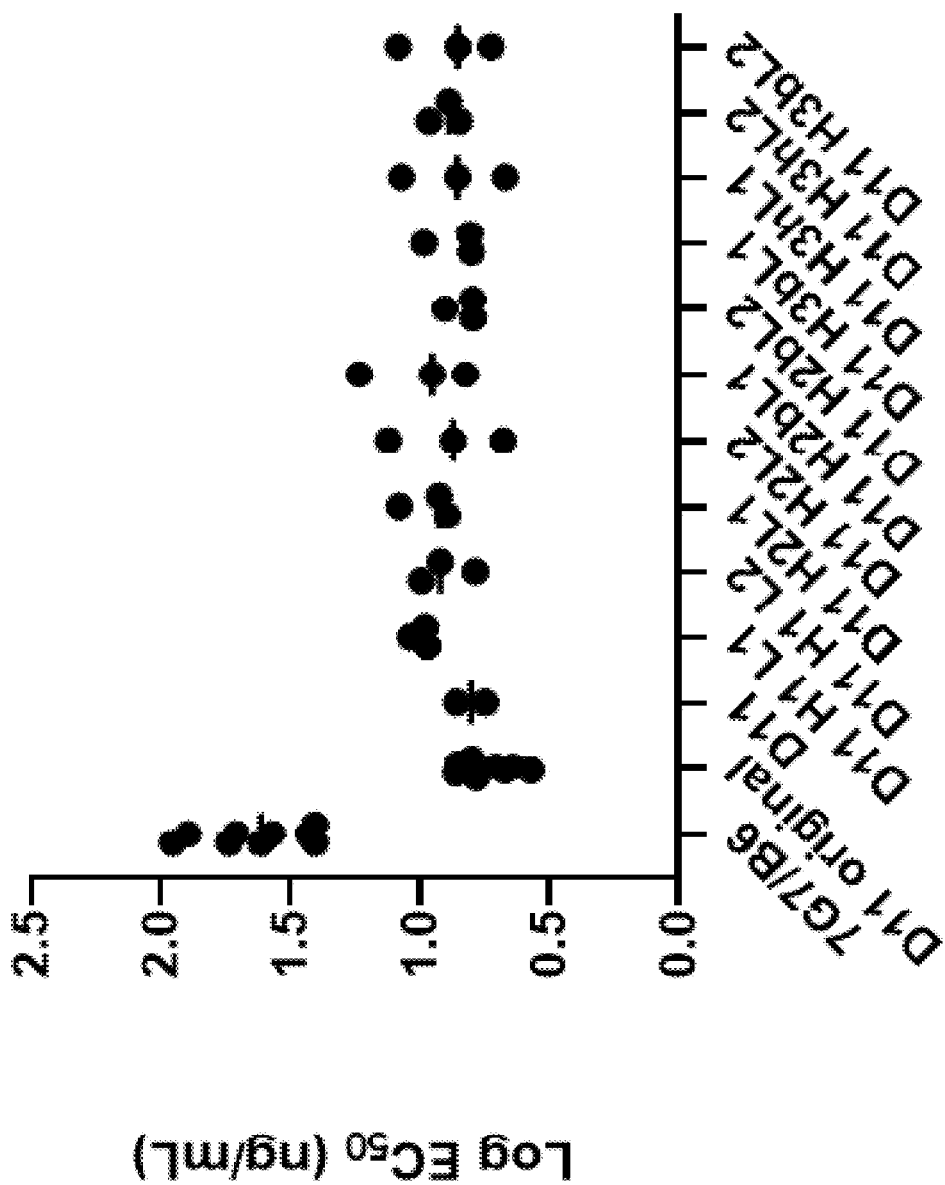
FIG. 7 shows that the D11 variants of the disclosure display no difference ADCC activity in SUDHL1 cancer cells, when compared to D11.

FIG. 7 shows that the D11 variants of the disclosure display no difference ADCC activity, when compared to D11 in cancer cells, showing that, as a general matter, the functionality is maintained.

Table 8 shows that certain D11 variants display higher ADCC activity, when tested in regulatory T cells. Certain variant antibodies, such as D11-H3h-L2, and D11-H3b-L2 exhibited higher ADCC activities (lower EC50), as when compared to the D11 parental antibody, and 7G7B6.

TABLE 8

| Antibody | Treg ADCC EC50 (ng/mL) |
| --- | --- |
| D11 | 13.5 |
| D11_H1L1 | 20.6 |
| D11_H1L2 | 46.7 |
| D11_H2L1 | 17.8 |
| D11_H2L2 | 13.3 |
| D11_H2bL1 | 8.9 |
| D11_H2bL2 | 14.5 |
| D11_H3bL1 | 31.7 |
| D11_H3bL2 | 7.7 |
| D11_H3L1 | 68.3 |
| D11_H3L2 | 4.8 |
| 7G7/B6 | 19.4 |
| Daclizumab | 6.0 |

Figure 8:
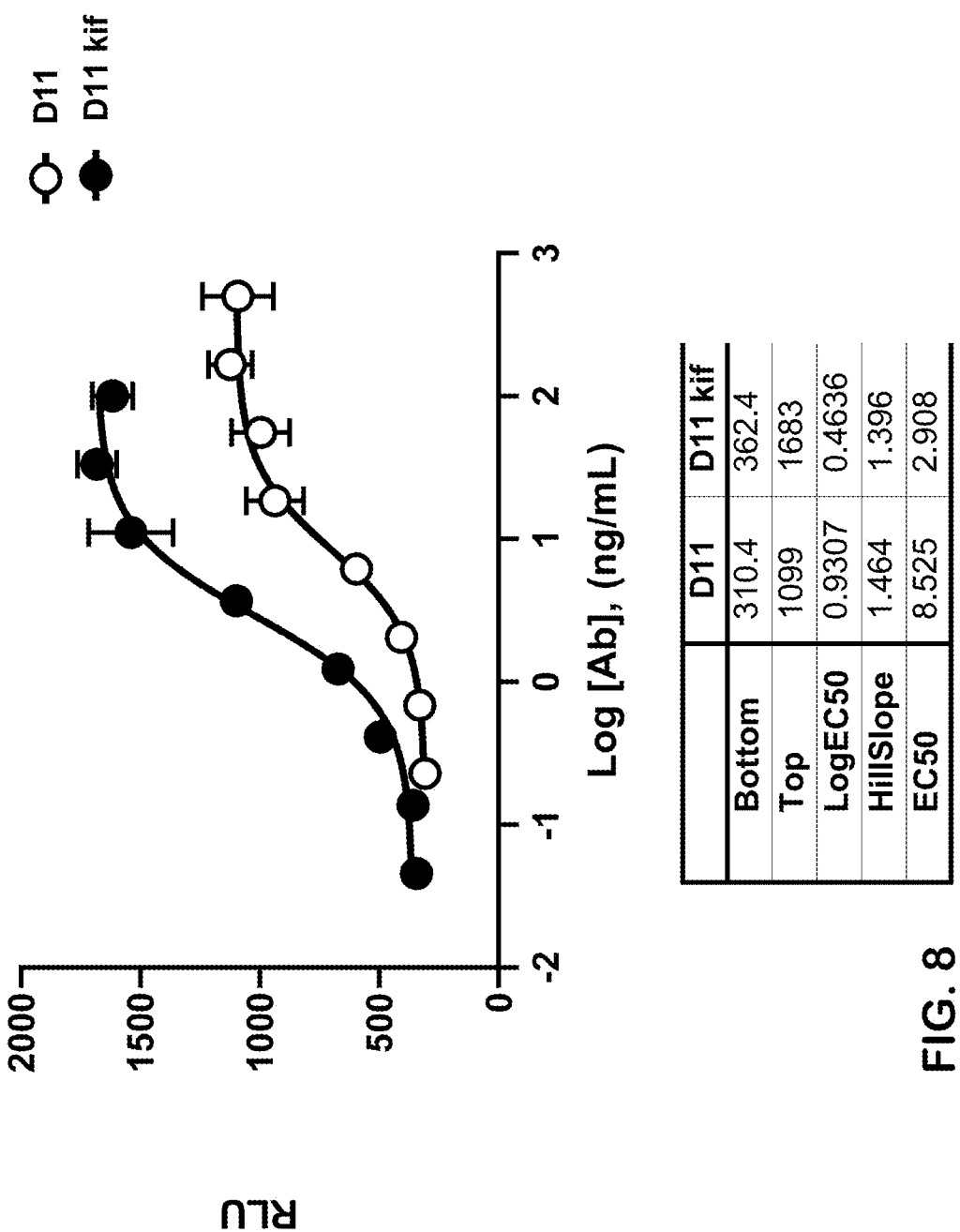
FIG. 8 shows that afucosylated D11 (D11 kif) exhibits higher ADCC activity in regulatory T cells (Tregs), the target cell type that expresses lower levels of CD25 antigen.

FIG. 8 shows that further when produced in a cell culture medium containing kifunensine, leading to the afucosylation of the antibodies, afucoyslated D11 exhibits higher Treg ADCC activity (D11 kif). The assay was carried out in a 384-well plate, with 20,000 cell/well.

Functional antibody-dependent cell phagocytosis (ADCP) assays may also be performed to test activity of macrophages to phagocytose Treg cells upon antibody binding. This may be an additional mechanism of action for Treg depletion. Fc receptor FCγRIIa (CD32b) on macrophages is thought to be the dominant inducer for ADCP. In this assay, primary Tregs will be used as target cells with human monocyte-derived macrophages as effector cells. PBMCs will be isolated from leukocyte reduction system chambers (Stanford Blood Center) for monocyte isolation using CD14 microbeads (Miltenyi Biotec) and for Tregs using Regulatory Human CD4+CD25+ T cell kit (Dynabeads) and Human Treg Cell Differentiation kit (R&D Systems). Monocytes will be cultured for 5-7 days with human serum or M-CSF in media. At days 5-7, macrophages will be cocultured with pre-labeled Tregs (labeled with a fixable viability dye (Invitrogen)) for 2-4 hours at 10 to 1 effector to target ratio with addition of anti-CD25 antibodies and controls, and fixed with fixation buffer (BD Biosciences). Macrophages will be stained with CD14 to identify macrophages from labeled Tregs, and analyzed for the phagocytic population defined as CD14+ and Treg labeled+ population using flow cytometry. Anti-CD25 antibodies are expected to also induce ADCP.

Example 8: Functional Characterization of CD25 Antibodies

Characterization, In Vitro

Subsequent in vitro characterizations may include T-cell activation and Treg suppression studies to evaluate the impact of the CD25 antibodies on T-effector cell responses in the absence and presence of Treg cells. Readouts for activation may include intracellular granzyme B, proliferation and cytokine release (e.g. IL-2, IFNγ, TNF-α). Specifically, human primary conventional T cells (T cony cells) from healthy donors and donors with specific antigen responses (e.g. human cytomegalovirus or influenza flu antigens) will be labeled with a cell proliferation dye (e.g. ThermoFisher) and treated with varying concentrations of CD25 and control antibodies (1-10 ug/mL), followed by activation using CD3/CD28 beads and incubated with and without Tregs for incubation at 37° C., 5% CO2 for 48-72 hours. To evaluate T cell activation, supernatants will be collected for cytokine analysis and cells will be stained with fixable viability dye (e.g. Thermofisher) and with surface anti human T cell markers: CD3, CD4, CD8, CD45RA, CD25, followed by fixation and permeabilization for staining of intracellular Granzyme B and Foxp3. Cells will be analyzed using flow cytometry for Granzyme B positive and proliferating cells.

Characterization, In Vivo

In vivo activity of CD25 antibodies can be assessed using a mouse xenograft tumor model. These experiments will help to distinguish differences in CD25 antibodies based on CD25+ tumor depletion via ADCC and/or ADCP. The variant antibodies can be produced as mouse IgG2a isotype antibodies and used in immunodeficient RAG−/− knockout mice (with functional NK and APC cells, but no mature B or T lymphocytes). Animals will be subcutaneously engrafted with CD25+ human cell lines (e.g SUDHL-1, a CD25+ anaplastic large cell lymphoma). Various size tumors (palpable, 100-500 mm3) may be used to discern the differences between antibodies. Animals will be treated with different doses of CD25 antibodies (e.g. 1-10 mg/kg, 3× weekly or once daily) and monitored for changes in body weight and TGI.

Drug Efficacy and MOA Studies in Mouse Xenograft Tumor Models in Humanized Mice.

The more effective variant antibodies for tumor growth inhibition via Treg depletion and increased intratumoral Teff/Treg ratio with increased T effector cell activity will be tested in various human tumor models (e.g. liver, breast, melanoma, gastric, NSCLC and colon cancer) to establish efficacy and mechanism of action. Some studies may include using the triple negative breast cancer cell line MDA-MB-231, a gastric cell line, melanoma cell line A375 and liver cancer cell line Huh-7 as well as human PDX models that have been well characterized and have either shown correlations between infiltrated Tregs and tumor growth and/or have been treated with PD-1 antibody combinations in humanized mice engrafted with human PBMCs and/or CD34+ cells. In these models, tumors will be subcutaneously engrafted until tumors reach a range of sizes from palpable to 100-500 mm3, and treated with various doses of CD25 antibodies and dosing schedules (e.g. 1-10 mg/kg, 3× weekly or once daily). Animal health scoring, bodyweight, tumor growth as well as immunophenotyping of blood and tumors will be performed to characterize tumor and immune cell composition and tumor infiltrating cells, and cytokine secretion using flow cytometry, Meso Scale Discovery multiplex plates and histology.

Combination studies in mouse xenograft tumor models in humanized mice. Once the lead candidate and indication is established based on efficacy and MOA studies, we will perform combination studies using a wide range of agents to increase immunogenicity and activation of other pathways for immune activation (e.g. chemotherapy, checkpoint inhibitors, TLR agonists, vaccines). Combination experiments will be conducted in similar tumor models used in efficacy and MOA studies.

All patents, patent applications, publications, documents, web links, and articles cited herein are incorporated herein by reference in their entireties.

What is claimed is:

1. A humanized antibody or binding fragment thereof, that binds human CD25, wherein the antibody or binding fragment thereof comprises a variable heavy chain comprising SEQ ID NO: 2, 3, 4, 5, or 6 and a variable light chain comprising SEQ ID NO: 8 or 9.

2. The humanized CD25 antibody of claim 1, wherein the antibody binds human CD25 and cynomolgus monkey CD25.

3. The humanized CD25 antibody of claim 1, wherein the antibody is afucosylated.

4. A pharmaceutical composition comprising a humanized antibody that binds human CD25, wherein the antibody comprises a variable heavy chain comprising SEQ ID NO: 2, 3, 4, 5, or 6 and a variable light chain comprising SEQ ID NO: 8 or 9, and one or more pharmaceutically acceptable excipients.

5. A nucleic acid sequence encoding a humanized antibody that binds human CD25, wherein the antibody comprises a variable heavy chain comprising SEQ ID NO: 2, 3, 4, 5, or 6 and a variable light chain comprising SEQ ID NO: 8 or 9.

6. A vector comprising the nucleic acid sequence of claim 5.

7. A method of treating a subject by depleting regulatory T cells comprising administering to the subject a therapeutically effective amount of a humanized antibody that binds human CD25, wherein the antibody comprises a variable heavy chain comprising SEQ ID NO: 2, 3, 4, 5, or 6 and a variable light chain comprising SEQ ID NO: 8 or 9, to deplete regulatory T cells, wherein the subject suffers from cancer or an autoimmune-related disease or disorder.

8. A method of depleting the number of regulatory T cells in a subject comprising administering to the subject a therapeutically effective amount of a humanized antibody that binds human CD25 or a pharmaceutical composition thereof, wherein the antibody comprises a variable heavy chain comprising SEQ ID NO: 2, 3, 4, 5, or 6 and a variable light chain comprising SEQ ID NO: 8 or 9.

9. The method of claim 8, wherein the subject suffers from cancer.

10. The method of claim 8, wherein the subject suffers from an autoimmune-related disease or disorder.

11. A method of depleting the number of regulatory T cells in a human sample comprising peripheral blood mononuclear cells comprising contacting the sample with a humanized antibody that binds human CD25, wherein the antibody comprises a variable heavy chain comprising SEQ ID NO: 2, 3, 4, 5, or 6 and a variable light chain comprising SEQ ID NO: 8 or 9, wherein the antibody depletes regulatory T cells.

12. A kit comprising a humanized antibody that binds human CD25 or a pharmaceutical composition thereof, wherein the antibody comprises a variable heavy chain comprising SEQ ID NO: 2, 3, 4, 5, or 6 and a variable light chain comprising SEQ ID NO: 8 or 9, and an instruction manual for use thereof.

* * * * *